US012731095B2

(12) United States Patent
Al-Temyatt

(10) Patent No.: US 12,731,095 B2
(45) Date of Patent: Sep. 8, 2026

(54) SYSTEMS AND METHODS FOR MODIFYING HYDROCARBON SUPPLY CHAINS BASED ON ESTIMATED HYDROCARBON SUPPLY CHAIN CARBON FOOTPRINT

(71) Applicant: Saudi Arabian Oil Company, Dhahran (SA)

(72) Inventor: Saud Al-Temyatt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 280 days.

(21) Appl. No.: 18/358,698

(22) Filed: Jul. 25, 2023

(65) Prior Publication Data

US 2025/0037058 A1 Jan. 30, 2025

(51) Int. Cl.
*G06Q 10/0637* (2023.01)
*G06Q 10/067* (2023.01)
(Continued)

(52) U.S. Cl.
CPC ..... *G06Q 10/06375* (2013.01); *G06Q 10/067* (2013.01); *G06Q 10/08* (2013.01); *G06Q 10/0838* (2013.01); *G06Q 50/06* (2013.01)

(58) Field of Classification Search
CPC ........... G06Q 10/06375; G06Q 10/067; G06Q 10/0838; G06Q 10/04; G06Q 10/063; G06Q 50/06; G06Q 10/08
See application file for complete search history.

(56) References Cited

U.S. PATENT DOCUMENTS 11,790,312 B1 * 10/2023 Foiles .................... G06Q 50/06 137/1
2009/0177505 A1 7/2009 Dietrich et al.
(Continued)

FOREIGN PATENT DOCUMENTS

CN 103824163 A 5/2014
WO 2022133330 A1 6/2022
(Continued)

OTHER PUBLICATIONS

Kshetri, "Blockchain's Roles in Meeting Key Supply Chain Management Objectives", International Journal of Information Management 39, pp. 80-89, 2018.
(Continued)

*Primary Examiner* — Charles Guiliano
(74) *Attorney, Agent, or Firm* — Dinsmore & Shohl LLP

(57) ABSTRACT

A method for estimating supply chain carbon footprint comprises: identifying a supply chain for carbon footprint estimation, wherein the supply chain includes a delivery stream comprising a plurality of network elements; identifying supply chain variables including network element variables; in response to determining a change to at least one of the network element variables, generating, using at least one of the network element variables, a plurality of emissions factors, wherein each of the plurality of emissions factors is associated with an affected network element and represents an emissions volume for a predetermined time interval; modeling, using at least one emissions factor of the plurality of emissions factors, an estimated carbon footprint produced by the delivery stream; and providing the estimated carbon footprint for output.

20 Claims, 7 Drawing Sheets

(51) Int. Cl.

| | |
|---|---|
| ***G06Q 10/08*** | (2024.01) |
| ***G06Q 10/083*** | (2024.01) |
| ***G06Q 50/06*** | (2024.01) |

(56) References Cited

U.S. PATENT DOCUMENTS

| | | | | |
|---|---|---|---|---|
| 2011/0119114 | A1 | 5/2011 | Singh et al. | |
| 2015/0051940 | A1 | 2/2015 | Bhowmik et al. | |
| 2021/0133670 | A1 | 5/2021 | Cella et al. | |
| 2021/0157947 | A1 | 5/2021 | Biazetti et al. | |
| 2022/0075515 | A1* | 3/2022 | Floren | G06F 30/12 |
| 2022/0107618 | A1 | 4/2022 | Schoeneboom et al. | |
| 2022/0138655 | A1 | 5/2022 | Kinai et al. | |
| 2022/0187847 | A1 | 6/2022 | Cella et al. | |
| 2022/0245574 | A1 | 8/2022 | Cella et al. | |
| 2022/0343229 | A1* | 10/2022 | Gruber | G06Q 20/02 |

FOREIGN PATENT DOCUMENTS

| | | | |
|---|---|---|---|
| WO | 2022221719 | A2 | 10/2022 |
| WO | 2022240906 | A1 | 11/2022 |

OTHER PUBLICATIONS

Notification of Transmittal of the International Search Report and the Written Opinion of the International Searching Authority, or the Declaration dated Nov. 8, 2024 pertaining to International application No. PCT/US2024/038280 filed Jul. 17, 2024, pp. 1-13.

Greene, S. et al. "Well-to-tank carbon emissions from crude oil maritime transportation" Transportation Research Part D: Transport and Environment, Pergamon, Amsterdam, NL, vol. 88, Oct. 14, 2020, pp. 1-8.

* cited by examiner 150
121
121A
121B
121C
134
132b
132a
104
128
130
μC
124
122a
122b
120
δ

SYSTEMS AND METHODS FOR MODIFYING HYDROCARBON SUPPLY CHAINS BASED ON ESTIMATED HYDROCARBON SUPPLY CHAIN CARBON FOOTPRINT

TECHNICAL FIELD

Embodiments described herein generally relate to systems and methods for supply chain modification in the context of hydrocarbon supply chains in the oil and gas industries, and specifically to computing systems that receive vast amounts of data associated with a supply chain and utilize that data to predict an estimated carbon footprint for an array of nodes and links throughout a supply chain and to modify the supply chain in response to the estimated carbon footprint.

BACKGROUND

The global supply chain refers to an international organization of producers, transporters, and sellers that collectively extract raw materials, process those raw materials into consumer products, transport the consumer products, and distribute the consumer products to consumers. While the supply chain has evolved organically via supply and demand of the various entities that produce those products, many recent events have illustrated that sustainability challenges can be catastrophic to the global economy. Sustainability challenges can include $CO_2$ emissions (i.e., a carbon footprint) of an organization or organizations operating a supply chain. Further, lower carbon footprint can provide a competitive advantage to an organization or organizations operating a supply chain by signaling to consumers the organization's or organizations' commitment to reducing $CO_2$ emissions.

As an example, the oil and gas industry is very important to the global economy, not to mention consumer well-being. Supply chains for hydrocarbons (e.g., distilled petroleum, gasoline, or natural gas) can span enormous distances across the planet, and identifying effective mechanisms for reducing $CO_2$ footprint can thereby be difficult. As such, there is a need to move away from single, isolated solutions for hydrocarbon supply chain resilience and flexibility and to move toward end-to-end (E2E) system solutions, to quickly, and incorporating data spanning end-to-end across a hydrocarbon supply chain, predict hydrocarbon supply chain carbon footprints and provide solutions for modifying the hydrocarbon supply chain to reduce such hydrocarbon supply chain carbon footprints.

SUMMARY

According to a first aspect A1, a system for hydrocarbon supply chain modification based on estimated hydrocarbon supply chain carbon footprint comprises: a hydrocarbon supply chain network element monitoring system; hydrocarbon supply chain modification hardware; a hydrocarbon supply chain data memory; a hydrocarbon supply chain carbon footprint estimation output translator; and a hydrocarbon supply chain carbon footprint estimator configured to cause the system to perform at least the following: identify a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receive, by the hydrocarbon supply chain data memory from the hydrocarbon supply chain network element monitoring system, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements; in response to determining a change to at least one of the network element variables, generate, using at least one of the network element variables, a plurality of emissions factors, wherein each emissions factor is associated with an affected network element of the plurality of hydrocarbon supply chain network elements and represents an emissions volume for a predetermined time interval; model, using at least one emissions factor of the plurality of emissions factors, an estimated carbon footprint produced by the delivery stream; generate, using the estimated carbon footprint, one or more hydrocarbon supply chain carbon footprint mitigation levers; and implement at least one of the hydrocarbon supply chain carbon footprint mitigation levers using the hydrocarbon supply chain carbon footprint estimation output translator, the hydrocarbon supply chain modification hardware, or both.

A second aspect A2 includes the system according to the first aspect A1, wherein the hydrocarbon supply chain carbon footprint estimator further causes the system to receive at least one proposed change to the hydrocarbon supply chain variables.

A third aspect A3 includes the system according to the second aspect A2, wherein the hydrocarbon supply chain carbon footprint estimator further causes the system to predict at least one potential hydrocarbon supply chain based on the at least one proposed change.

A fourth aspect A4 includes the system according to the third aspect A3, wherein predicting the at least one potential hydrocarbon supply chain includes determining a similarity of the at least one potential hydrocarbon supply chain to the plurality of hydrocarbon supply chain variables.

A fifth aspect A5 includes the system according to the fourth aspect A4, wherein predicting of one or more potential supply chains further comprises: predicting, by the hydrocarbon supply chain carbon footprint estimator, a plurality of alternate supply chain variables; constructing, by the hydrocarbon supply chain carbon footprint estimator, at least one alternate hydrocarbon supply chain; and scoring, by the hydrocarbon supply chain carbon footprint estimator, the at least one alternate hydrocarbon supply chains according to a similarity of each alternate hydrocarbon supply chain of the one or more alternate hydrocarbon supply chains to the plurality of hydrocarbon supply chain variables.

A sixth aspect A6 includes the system according to the third aspect A3 or the fourth aspect A4, wherein the hydrocarbon supply chain carbon footprint estimator further causes the system to: construct at least one potential hydrocarbon supply chain, wherein each of the at least one potential hydrocarbon supply chains includes a differing set of alternate hydrocarbon supply chain variables; score each potential hydrocarbon supply chain of the one or more potential hydrocarbon supply chains according to minimization of estimated carbon footprint; and output, by the hydrocarbon supply chain carbon footprint estimation output translator and according to the scoring of each potential hydrocarbon supply chain of the one or more potential hydrocarbon supply chains, estimated carbon footprints of each potential hydrocarbon supply chain of the one or more potential hydrocarbon supply chains.

A seventh aspect A7 includes the system according to any of the aspects A1-A6, wherein generating the estimated carbon footprint further comprises generating an alert for a change in carbon footprint.

An eighth aspect A8 includes the system according to the seventh aspect A7, wherein generating the estimated carbon footprint further comprises displaying, using the hydrocarbon supply chain carbon footprint estimation output translator, the estimated carbon footprint and at least one of the alert and the hydrocarbon supply chain carbon footprint mitigation lever in a visualization.

A ninth aspect A9 includes the system according to the eighth aspect A8, wherein the visualization is integrated into a digital twin of the delivery stream.

A tenth aspect A10 includes the system according to the eighth aspect A8 or the ninth aspect A9, wherein the visualization further comprises effect comparisons of at least two hydrocarbon supply chain carbon footprint mitigation levers of the one or more hydrocarbon supply chain carbon footprint mitigation levers.

An eleventh aspect A11 includes the system according to any of the aspects A8-A10, wherein the visualization further comprises scenario modeling of the hydrocarbon supply chain carbon footprint mitigation lever, wherein the scenario modeling identifies subsequent effects of choosing the hydrocarbon supply chain carbon footprint mitigation lever.

A twelfth aspect A12 includes the system according to any of the aspects A7-A11, wherein the alert indicates an estimated hydrocarbon supply chain carbon footprint change of the delivery stream, wherein the estimated carbon footprint change exceeds a predetermined threshold.

A thirteenth aspect A13 includes the system according to any of the aspects A1-A12, wherein the hydrocarbon supply chain carbon footprint mitigation lever includes at least one of the following: updating an unfulfilled purchase order, changing at least one supply chain node or supply chain link of the delivery stream, or changing materials used, consumed, processed, produced, or transported in the supply chain.

A fourteenth aspect A14 includes the system according to any of the aspects A1-A13, wherein the hydrocarbon supply chain carbon footprint estimator includes at least one of the following: an artificial intelligence (AI) forecasting algorithm, a Monte Carlo simulation, an AI optimization algorithm, or an MILP algorithm.

According to a fifteenth aspect B1, method for modifying a hydrocarbon supply chain based on estimated hydrocarbon supply chain carbon footprint comprises: identifying, by a hydrocarbon supply chain carbon footprint estimator, a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receiving, by a hydrocarbon supply chain data memory from a hydrocarbon supply chain network element monitoring system, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements; in response to determining a change to at least one of the network element variables, generating, by the hydrocarbon supply chain carbon footprint estimator and using at least one of the network element variables, a plurality of emissions factors, wherein each of the plurality of emissions factors is associated with an affected network element of the plurality of hydrocarbon supply chain network elements and represents an emissions volume for a predetermined time interval; modeling, by the hydrocarbon supply chain carbon footprint estimator and using at least one emissions factor of the plurality of emissions factors, an estimated carbon footprint produced by the delivery stream; generating, by the hydrocarbon supply chain carbon footprint estimator and using the estimated carbon footprint, one or more hydrocarbon supply chain carbon footprint mitigation levers; and implementing at least one of the hydrocarbon supply chain carbon footprint mitigation levers using a hydrocarbon supply chain carbon footprint estimation output translator, hydrocarbon supply chain modification hardware, or both.

A sixteenth aspect B2 includes the method according to the fifteenth aspect B1, further comprising receiving at least one proposed change to the hydrocarbon supply chain variables.

A seventeenth aspect B3 includes the method according to the sixteenth aspect B2, further comprising predicting, by the hydrocarbon supply chain carbon footprint estimator, at least one potential hydrocarbon supply chain based on the at least one proposed change.

An eighteenth aspect B4 includes the method according to the seventeenth aspect B3, wherein predicting the at least one potential hydrocarbon supply chain includes determining a similarity of the at least one potential hydrocarbon supply chain to the plurality of hydrocarbon supply chain variables.

A nineteenth aspect B5 includes the method according to the eighteenth aspect B4, wherein predicting of one or more potential supply chains further comprises: predicting, by the hydrocarbon supply chain carbon footprint estimator, a plurality of alternate supply chain variables; constructing, by the hydrocarbon supply chain carbon footprint estimator, at least one alternate hydrocarbon supply chain; and scoring, by the hydrocarbon supply chain carbon footprint estimator, the at least one alternate hydrocarbon supply chains according to a similarity of each alternate hydrocarbon supply chain of the one or more alternate hydrocarbon supply chains to the plurality of hydrocarbon supply chain variables.

A twentieth aspect B6 includes the method according to the seventeenth aspect B3 or the eighteenth aspect B4, the method further comprising: constructing, by the hydrocarbon supply chain carbon footprint estimator, at least one potential hydrocarbon supply chain, wherein each of the at least one potential hydrocarbon supply chains includes a differing set of alternate hydrocarbon supply chain variables; scoring, by the hydrocarbon supply chain carbon footprint estimator, each potential hydrocarbon supply chain of the one or more potential hydrocarbon supply chains according to minimization of estimated carbon footprint; and outputting, by the hydrocarbon supply chain carbon footprint estimation output translator and according to the scoring of each potential hydrocarbon supply chain of the one or more potential hydrocarbon supply chains, estimated carbon footprints of each potential hydrocarbon supply chain of the one or more potential hydrocarbon supply chains.

A twenty-first aspect B7 includes the method according to any of the aspects B1-B6, wherein generating the estimated carbon footprint further comprises generating an alert for a change in carbon footprint.

An twenty-second aspect B8 includes the method according to the twenty-first aspect B7, wherein generating the estimated carbon footprint further comprises displaying, using the hydrocarbon supply chain carbon footprint estimation output translator, the estimated carbon footprint and at least one of the alert and the hydrocarbon supply chain carbon footprint mitigation lever in a visualization.

A twenty-third aspect B9 includes the method according to the twenty-second aspect B8, wherein the visualization is integrated into a digital twin of the delivery stream.

A twenty-fourth aspect B10 includes the method according to the twenty-second aspect B8 or the twenty-third aspect B9, wherein the visualization further comprises effect comparisons of at least two hydrocarbon supply chain carbon footprint mitigation levers of the one or more hydrocarbon supply chain carbon footprint mitigation levers.

A twenty-fifth aspect B11 includes the method according to any of the aspects B8-B10, wherein the visualization further comprises scenario modeling of the hydrocarbon supply chain carbon footprint mitigation lever, wherein the scenario modeling identifies subsequent effects of choosing the hydrocarbon supply chain carbon footprint mitigation lever.

A twenty-sixth aspect B12 includes the method according to any of the aspects B7-B11, wherein the alert indicates an estimated hydrocarbon supply chain carbon footprint change of the delivery stream, wherein the estimated carbon footprint change exceeds a predetermined threshold.

A twenty-seventh aspect B13 includes the method according to any of the aspects B1-B12, wherein the hydrocarbon supply chain carbon footprint mitigation lever includes at least one of the following: updating an unfulfilled purchase order, changing at least one supply chain node or supply chain link of the delivery stream, or changing materials used, consumed, processed, produced, or transported in the supply chain.

A twenty-eighth aspect B14 includes the method according to any of the aspects B1-B13, wherein the hydrocarbon supply chain carbon footprint estimator includes at least one of the following: an artificial intelligence (AI) forecasting algorithm, a Monte Carlo simulation, an AI optimization algorithm, or an MILP algorithm.

According to a twenty-ninth aspect C1, a non-transitory computer-readable medium stores logic that, when executed by a hydrocarbon supply chain carbon footprint estimator, causes the hydrocarbon supply chain carbon footprint estimator to perform at least the following: identify a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receive, by a hydrocarbon supply chain data memory from a hydrocarbon supply chain network element monitoring system, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements; in response to determining a change to at least one of the network element variables, generate, using at least one of the network element variables, a plurality of emissions factors, wherein each emissions factor is associated with an affected network element of the plurality of hydrocarbon supply chain network elements and represents an emissions volume for a predetermined time interval; model, using at least one emissions factor of the plurality of emissions factors, an estimated carbon footprint produced by the delivery stream; generate, using the estimated carbon footprint, one or more hydrocarbon supply chain carbon footprint mitigation levers; and implement at least one of the hydrocarbon supply chain carbon footprint mitigation levers using a hydrocarbon supply chain carbon footprint estimation output translator, hydrocarbon supply chain modification hardware, or both.

A thirtieth aspect C2 includes the non-transitory computer-readable medium according to the twenty-ninth aspect C1, wherein the logic further causes the hydrocarbon supply chain carbon footprint estimator to receive least one proposed change to the hydrocarbon supply chain variables.

A thirty-first aspect C3 includes the non-transitory computer-readable medium according to the thirtieth aspect C2, wherein the logic further causes the hydrocarbon supply chain carbon footprint estimator to predict at least one potential hydrocarbon supply chain based on the at least one proposed change.

An thirty-second aspect C4 includes the non-transitory computer-readable medium according to the thirty-first aspect C3, wherein predicting the at least one potential hydrocarbon supply chain includes determining a similarity of the at least one potential hydrocarbon supply chain to the plurality of hydrocarbon supply chain variables.

A thirty-third aspect C5 includes the non-transitory computer-readable medium according to the thirty-second aspect C4, wherein predicting of one or more potential supply chains further comprises: predicting, by the hydrocarbon supply chain carbon footprint estimator, a plurality of alternate supply chain variables; constructing, by the hydrocarbon supply chain carbon footprint estimator, at least one alternate hydrocarbon supply chain; and scoring, by the hydrocarbon supply chain carbon footprint estimator, the at least one alternate hydrocarbon supply chains according to a similarity of each alternate hydrocarbon supply chain of the one or more alternate hydrocarbon supply chains to the plurality of hydrocarbon supply chain variables.

A thirty-fourth aspect C6 includes the non-transitory computer-readable medium according to the thirty-first aspect C3 or the thirty-second aspect C4, wherein the logic further causes the hydrocarbon supply chain carbon footprint estimator to: construct at least one potential hydrocarbon supply chain, wherein each of the at least one potential hydrocarbon supply chains includes a differing set of alternate hydrocarbon supply chain variables; score each potential hydrocarbon supply chain of the one or more potential hydrocarbon supply chains according to minimization of estimated carbon footprint; and output, by the hydrocarbon supply chain carbon footprint estimation output translator and according to the scoring of each potential hydrocarbon supply chain of the one or more potential hydrocarbon supply chains, estimated carbon footprints of each potential hydrocarbon supply chain of the one or more potential hydrocarbon supply chains.

A thirty-fifth aspect C7 includes the non-transitory computer-readable medium according to any of the aspects C1-C6, wherein generating the estimated carbon footprint further comprises generating an alert for a change in carbon footprint.

An thirty-sixth aspect C8 includes the non-transitory computer-readable medium according to the thirty-fifth aspect C7, wherein generating the estimated carbon footprint further comprises displaying, using the hydrocarbon supply chain carbon footprint estimation output translator, the estimated carbon footprint and at least one of the alert and the hydrocarbon supply chain carbon footprint mitigation lever in a visualization.

A thirty-seventh aspect C9 includes the non-transitory computer-readable medium according to the thirty-sixth aspect C8, wherein the visualization is integrated into a digital twin of the delivery stream.

A thirty-eighth aspect C10 includes the non-transitory computer-readable medium according to the thirty-sixth aspect C8 or the thirty-seventh aspect C9, wherein the visualization further comprises effect comparisons of at least two hydrocarbon supply chain carbon footprint mitigation levers of the one or more hydrocarbon supply chain carbon footprint mitigation levers.

A thirty-ninth aspect C11 includes the non-transitory computer-readable medium according to any of the aspects C8-C10, wherein the visualization further comprises scenario modeling of the hydrocarbon supply chain carbon footprint mitigation lever, wherein the scenario modeling identifies subsequent effects of choosing the hydrocarbon supply chain carbon footprint mitigation lever.

A fortieth aspect C12 includes the non-transitory computer-readable medium according to any of the aspects C7-C11, wherein the alert indicates an estimated hydrocarbon supply chain carbon footprint change of the delivery stream, wherein the estimated carbon footprint change exceeds a predetermined threshold.

A forty-first aspect C13 includes the non-transitory computer-readable medium according to any of the aspects C1-C12, wherein the hydrocarbon supply chain carbon footprint mitigation lever includes at least one of the following: updating an unfulfilled purchase order, changing at least one supply chain node or supply chain link of the delivery stream, or changing materials used, consumed, processed, produced, or transported in the supply chain.

A forty-second aspect C14 includes the non-transitory computer-readable medium according to any of the aspects C1-C13, wherein the hydrocarbon supply chain carbon footprint estimator includes at least one of the following: an artificial intelligence (AI) forecasting algorithm, a Monte Carlo simulation, an AI optimization algorithm, or an MILP algorithm.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for estimating supply chain carbon footprint. In some embodiments, artificial intelligence (AI) and various modeling methods may use a data set collected from multiple sources end-to-end across a supply chain to visualize, predict, and provide decision support for supply chain carbon footprint.

In some embodiments, data sets may be combined from a plurality of sources (e.g., demand planning, procurement, suppliers, inventory, warehousing, logistics, etc.) to simulate carbon footprints in advance, such as carbon footprints of a process, material, node, link, and/or delivery stream within the supply chain or of the supply chain itself. In some embodiments, procurement teams may be provided with decision-making support to accurately assess carbon footprints of real or potential supply chains and carbon footprint mitigation levers which may reduce the carbon footprint of the real or potential supply chains.

In some embodiments, a supply chain carbon footprint may be estimated in the context of a broader "digital twin" of part or all of the supply chain for which a carbon footprint is estimated. A digital twin may be a digital representation or recreation (e.g., a visualization or other interface) of a real-world system (e.g., a supply chain) which may be used for compiling large amounts of data (e.g., data spanning end-to-end across a supply chain), representing that data to a user in a single interface, and simulating further changes to the data based on, e.g., proposed modifications input by a user or forecasted changes in supply chain data. As will be described in further detail below, a system or method for estimating supply chain carbon footprint may be implemented within a digital twin to both access supply chain data for carbon footprint estimation and to integrate carbon footprint estimations and associated carbon footprint mitigation levers into an interface or visualization of the digital twin.

Figure 1A:
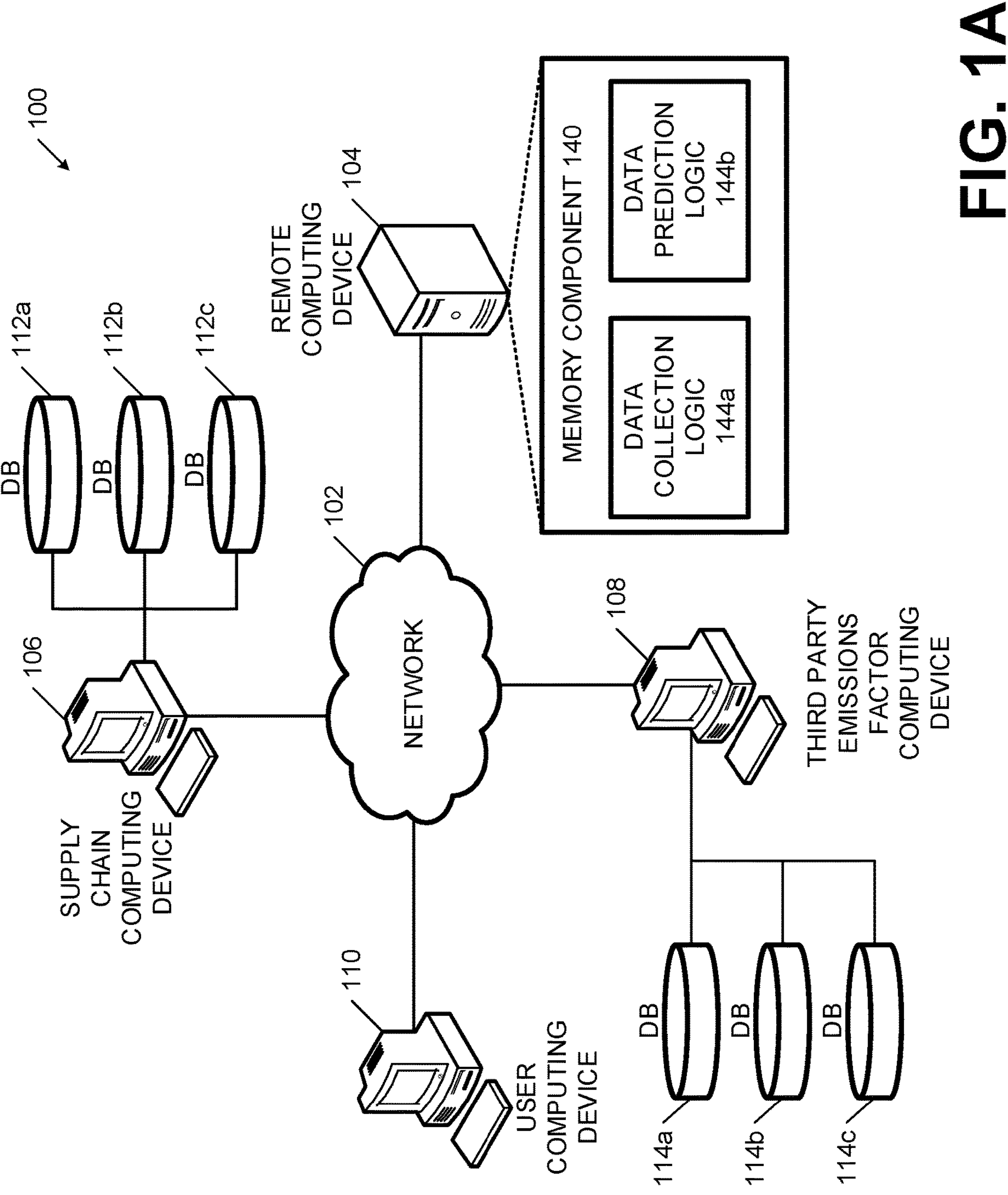
FIG. 1A schematically depicts a computing environment for estimating supply chain carbon footprint, according to one or more embodiments shown and described herein.

FIG. 1A depicts a computing environment 100 for estimating supply chain carbon footprint. The computing environment 100 generally includes a network 102 that is coupled to a remote computing device 104, a supply chain computing device 106, a third party emissions factor computing device 108, and a user computing device 110.

The network 102 may include a wide area network (WAN), such as the internet, a public switched telephone network, a cellular network, a mobile data network, and/or the like, such as via (WiMax, LTE, 4G, 5G, etc.). The network 102 may include a local network, such as a wired network (e.g., such as via Ethernet, etc.), a wireless network (such as via Wi-Fi, etc.). The network 102 may similarly facilitate direct device-to-device communication, such as via Bluetooth, Zigbee, etc. Regardless, the network 102 may be configured to couple a the remote computing device 104 with the supply chain computing device 106, the third party emissions factor computing device 108, and the user computing device 110.

It is noted that the description herein includes recitations of a supply chain "node" or "link." For the purposes of this application, a supply chain "node" is a location where goods are at rest (e.g., a production facility, a holding facility, a processing facility, etc.), and supply chain "links" are transportation lines along which goods are moved between nodes. As such, a product may have a "start node" and an "end node," where a "start node" is a node where the end product, a part of the end product, or a material used to produce the end product of the supply chain is first introduced into the supply chain (e.g., wherein the end product, part of the end product, or material used to produce the end product is first manufactured, produced, processed, extracted, procured, or otherwise generated), while an "end node" is a node where the end product exits the supply chain (by, e.g. consuming the end product, transferring the end product to a client, business partner, consumer, or other third party, or otherwise removing the end product from the control of the party or parties operating the supply chain). Similarly, a "delivery stream" is the order of nodes and links within a supply chain that a particular stock keeping unit (SKU) of a product travels to navigate from the SKUs start node to end node. A product's supply chain may have multiple start and end nodes, so different individual SKUs of a product may have different delivery streams within the same supply chain (i.e., an individual SKU may not traverse every node and/or link within a single supply chain). Nodes and links of a supply chain, in addition to processes occurring in one or more nodes or links, are described herein collectively as "network elements." A supply chain and/or a delivery stream thereby may comprise many network elements, and a network element may comprise one or more nodes, links, and/or processes of a supply chain.

It is noted that the description herein includes recitations of "emissions factors." For the purposes of this application, an "emissions factor" is a value representing an estimated carbon emissions volume associated with an activity. As such, an emissions factor may be a different unit depending on the network element with which the factor is associated. For example, if the emissions factor is associated with a production node, then the emissions factor may be a value indicating an estimated volume of carbon emissions per a time interval (e.g., a day, month, or year, on an averaged basis), per unit of product manufactured, or another metric. If the emissions factor is associated with a link, the emissions factor may be a value indicating an estimated volume of carbon emissions per distance traveled, per a choice of travel mechanism along a predetermined distance, per a certain volume of a material or product transported, or another metric. If the emissions factor is associated with an process, the emissions factor may be a value indicating an estimated volume of carbon emissions per a certain volume of an input material consumed by the process, per unit of an output product of the process, per a time interval (e.g., a day, month, or year, on an averaged basis), or another metric. Emissions factors may be associated with any network element of a supply chain, and any network element may be associated with a plurality of emissions factors (relating to, e.g., a plurality of processes, a plurality of purchase orders, or a plurality of nodes/links).

Figure 1B:
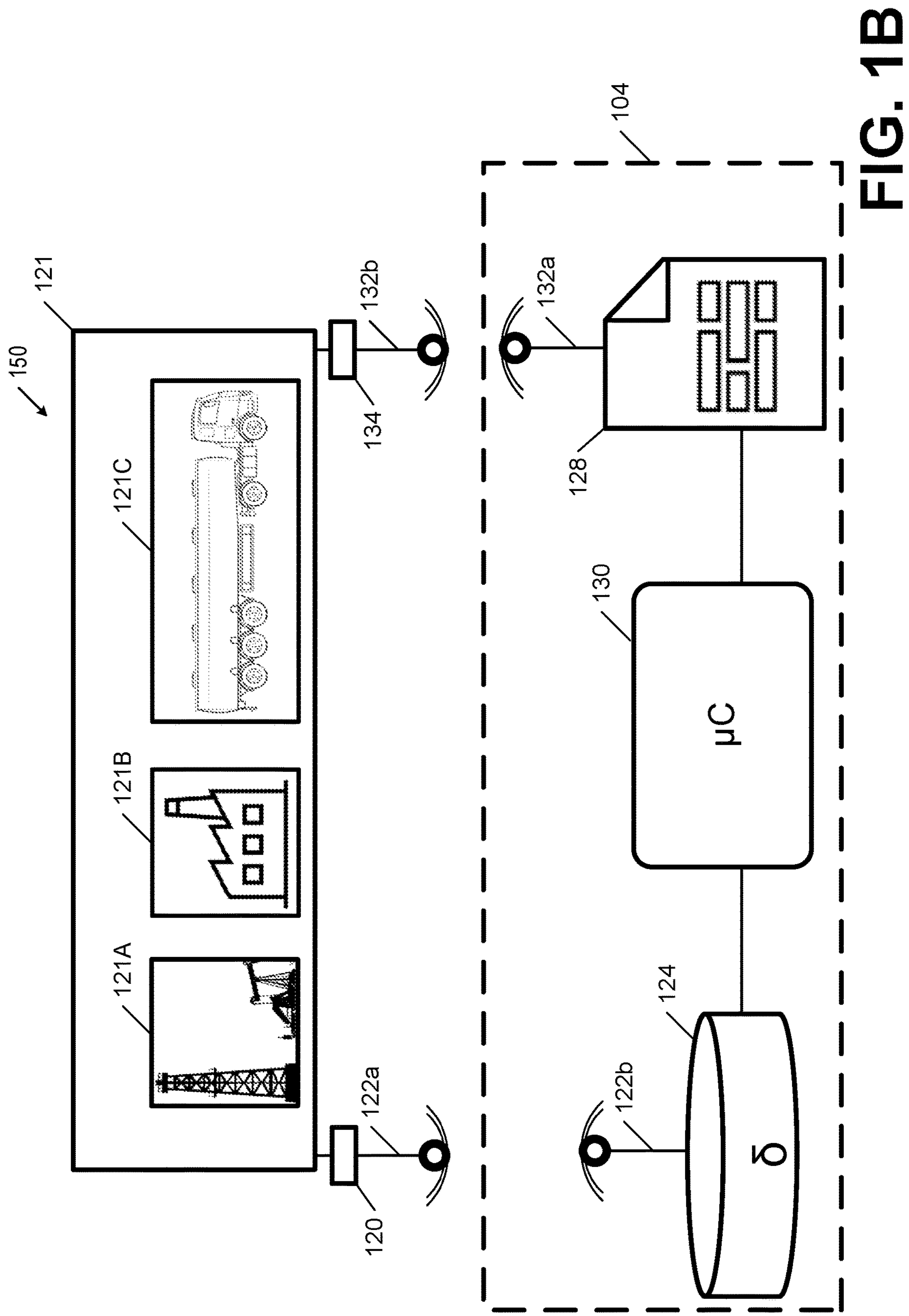
FIG. 1B schematically depicts other hardware for estimating supply chain carbon footprint and implementing results of supply chain carbon footprint estimation, according to one or more embodiments shown and described herein.

FIG. 1B depicts a system 150 for hydrocarbon supply chain modification based on estimated hydrocarbon supply chain carbon footprint. The system 150 provides input data and implements results of supply chain carbon footprint estimation for a hydrocarbon supply chain (e.g., a supply chain in which an end product of the supply chain is a refined or unrefined a hydrocarbon, including, e.g., crude oil, petroleum, natural gas, and/or any refined forms of the previous), according to embodiments provided herein. The supply chain of the system 150 comprises hydrocarbon supply chain network elements 121, including, in the embodiment depicted in FIG. 1B, a hydrocarbon extraction site 121A, a hydrocarbon refinement facility 121B, and an hydrocarbon transportation system 121C (e.g., a link wherein hydrocarbons or materials used to, e.g., produce, extract, or process hydrocarbons are transferred from a first node and/or first third party and to a second node and/or second third party) for transporting hydrocarbons from the hydrocarbon extraction site 121A and to the hydrocarbon refinement facility 121B, or from the hydrocarbon refinement facility 121B and to a third party (e.g., a consumer), or to and/or from any other node within the hydrocarbon supply chain of the system 150 and/or any third party.

In embodiments, the hydrocarbon extraction site 121A may include one or more drilling rigs, artificial lift systems (e.g., hardware used to reduce bottomhole pressure on a hydrocarbon-containing formation to obtain a higher production rate of hydrocarbons from the same), other facilities for hydrocarbon extraction, as may be understood by a person having ordinary skill in the art, and/or any combination thereof. In embodiments, the hydrocarbon refinement facility 121B may include one or more hydrocarbon refineries, hydrocarbon reactors, hydrocarbon separators, hydrocarbon processing units, other facilities for processing hydrocarbons, as may be understood by a person having ordinary skill in the art, and/or any combination thereof. In embodiments, the hydrocarbon transportation system 121C may include one or more networks of trucks, pipelines, planes, trains, water vessels, other hydrocarbon transportation mechanisms, as may be understood by a person having ordinary skill in the art, and/or any combination thereof.

In embodiments, the hydrocarbon supply chain network elements 121 may include one of, a plurality of, or none of any or all of the hydrocarbon extraction site 121A, the hydrocarbon refinement facility 121B and/or the hydrocarbon transportation system 121C, in any combination thereof. In embodiments, the hydrocarbon supply chain network elements 121 may include types of links or nodes not depicted in FIG. 1B (e.g., other links and nodes described below, such as any node wherein a material is). In embodiments, the hydrocarbon extraction site 121A may, alternatively, be any resource production node (e.g., a node wherein an end product of the supply chain, part of the end product, or material used to produce the end product is first manufactured, produced, processed, extracted, procured, or otherwise generated), such as types of nodes described elsewhere herein. In embodiments, the hydrocarbon refinement facility 121B may, alternatively, be any resource processing node (e.g., a node wherein an end product of the supply chain or materials used to produce the end product are manufactured, processed, produced, refined, or otherwise generated), such as types of nodes described elsewhere herein. In embodiments, the hydrocarbon transportation system 121C may be any link between nodes and/or third parties (e.g., a link wherein any end product of the supply chain or materials used to produce the end product(s) are transferred from a first node and/or first third party and to a second node and/or second third party), such as types of links described elsewhere herein.

The hydrocarbon supply chain network elements 121 may be a single supply chain node or process. The hydrocarbon supply chain network elements 121 may be a plurality of supply chain nodes, processes, links, or any combination thereof. The hydrocarbon supply chain network elements 121 may include all nodes of the system 150. The supply chain network elements 121 may include only some nodes of the hydrocarbon supply chain of the system 150. The hydrocarbon supply chain network elements 121 may include only a single node of the hydrocarbon supply chain of the system 150. The hydrocarbon supply chain network elements 121 may include all links of the hydrocarbon supply chain of the system 150. The hydrocarbon supply chain network elements 121 may include only some links of the hydrocarbon supply chain of the system 150. The hydrocarbon supply chain network elements 121 may include only a single link of the hydrocarbon supply chain of the system 150. The hydrocarbon supply chain network elements 121 may include all nodes and links of the hydrocarbon supply chain of the system 150. In embodiments, the hydrocarbon supply chain network elements 121 may include only some nodes and links of the hydrocarbon supply chain of the system 150.

As illustrated, hydrocarbon supply chain network elements 121 may include a hydrocarbon supply chain network element monitoring system 120 that may detect data about the hydrocarbon supply chain network elements 121, including amounts and compositions of hydrocarbons stored, processed, and/or extracted in any of the hydrocarbon supply chain network elements 121, amounts of materials stored and/or used in any of the hydrocarbon supply chain network elements 121 for the processing, extraction, use, and/or transportation of hydrocarbons at any of the hydrocarbon supply chain network elements 121, and/or emissions data about the hydrocarbon supply chain network elements 121 including, e.g., processes, hardware, and/or materials stored, processed, and/or extracted in any of the hydrocarbon supply chain network elements 121. In some embodiments, the hydrocarbon supply chain network element monitoring system 120 may include or be coupled to at least one sensor, as well as a storage device. In embodiments, the storage device may store one or more identifiers of a material e.g., consumed, processed, manufactured, produced, transported, and/or otherwise used within one or more nodes, links, or processes of the supply chain network elements 121, including the hydrocarbon extraction site 121A, the hydrocarbon refinement facility 121B, and the hydrocarbon transportation system 121C. In embodiments, the material may be any hydrocarbon (e.g., crude oil, petroleum, or natural gas), or a material consumed, processed, manufactured, produced, transported, and/or otherwise used in the extraction, processing, transportation, or use of hydrocarbons within the hydrocarbon supply chain. In embodiments, the storage device may store one or more identifiers of hardware located or used within one or more nodes, links, or processes of the supply chain network elements 121, including the hydrocarbon extraction site 121A, the hydrocarbon refinement facility 121B, and the hydrocarbon transportation system 121C. In embodiments, the storage device may store one or more identifiers of processes occurring within or relating to one or more nodes, links, or processes of the supply chain network elements 121, including the hydrocarbon extraction site 121A, the hydrocarbon refinement facility 121B, and the hydrocarbon transportation system 121C. In embodiments, the storage device may store one or more identifiers of emissions factors, such as emissions factors relating to materials, hardware, or processes, relating to one or more nodes, links, or processes of the supply chain network elements 121, including the hydrocarbon extraction site 121A, the hydrocarbon refinement facility 121B, and the hydrocarbon transportation system 121C. In embodiments, the hydrocarbon supply chain network element monitoring system may include physical sensors such as temperature sensors, pressure sensors, flow meters, scales, global positioning system trackers, and/or other physical sensors.

In some embodiments, the hydrocarbon supply chain network element monitoring system 120 may include physical sensors for determining quantities of a material consumed, processed, manufactured, produced, transported, and/or otherwise used in any of the hydrocarbon supply chain network elements 121, processing of the material, production of the material, or usage of the material in a node or link of the supply chain network elements 121 (e.g., one, some, or all of the hydrocarbon extraction site 121A, the hydrocarbon refinement facility 121B, and the hydrocarbon transportation system 121C), as described in more detail below. In some embodiments, the hydrocarbon supply chain network element monitoring system 120 may include physical sensors for determining emissions factors and/or data used for calculating emissions factors relating to materials, hardware, and/or processes in a node or link of the supply chain network elements 121 (e.g., one, some, or all of the hydrocarbon extraction site 121A, the hydrocarbon refinement facility 121B, and the hydrocarbon transportation system 121C), as described in more detail below.

In embodiments, the hydrocarbon supply chain network element monitoring system 120 may include one or more physical sensors located at the hydrocarbon extraction site 121A for determining an amount of hydrocarbon and/or of phases of hydrocarbon stored at the hydrocarbon extraction site 121A, an amount of materials used or consumed in hydrocarbon extraction at the hydrocarbon extraction site 121A, an amount of hydrocarbon or of phases of hydrocarbon extracted in a given time period at the hydrocarbon extraction site 121A (e.g., on a per-day basis), and/or emissions factors or data used for calculating emissions factors relating to materials used or consumed in hydrocarbon extraction and/or storage at the hydrocarbon extraction site 121A.

In embodiments, the hydrocarbon supply chain network element monitoring system 120 may include one or more physical sensors located at the hydrocarbon refinement facility 121B for determining an amount of hydrocarbons or of phases of hydrocarbons stored at the hydrocarbon refinement facility 121B, an amount of materials used or consumed in hydrocarbon refinement stored at the hydrocarbon refinement facility 121B, an amount of hydrocarbons refined at the hydrocarbon refinement facility 121B (e.g., on a per-day basis), and/or emissions factors or data used for calculating emissions factors relating to materials used or consumed in hydrocarbon refinement and/or storage at the hydrocarbon refinement facility 121B.

In some embodiments, the hydrocarbon supply chain network element monitoring system 120 may include physical sensors for determining quantities of the material, location of the material, estimated delivery dates of the material transported within a link of the hydrocarbon supply chain network elements 121 (e.g., the hydrocarbon transportation system 121C) and/or emissions factors associated with transportation of the material transported within a link of the hydrocarbon supply chain network elements 121 (e.g., the hydrocarbon transportation system 121C). In some embodiments, the hydrocarbon supply chain network element monitoring system 120 may include one or more physical sensors for determining a transportation capacity of the hydrocarbon transportation system 121C, including, e.g., a number of transportation vehicles available of the hydrocarbon transportation system 121C, locations of vehicles of the hydrocarbon transportation system 121C, total and/or available material carrying capacity (measured in, e.g., barrels of crude oil, petroleum, or natural gas) of one, some, or all vehicles of the hydrocarbon transportation system 121C, or stored amounts of fuel for operation of vehicles (e.g., trucks, pipelines, planes, or trains) of the hydrocarbon transportation system 121C. Accordingly, the hydrocarbon supply chain network element monitoring system 120 may include sensors for estimating delivery dates of hydrocarbons transported within the hydrocarbon transportation system 121C, a maximum throughput of the hydrocarbons within the hydrocarbon transportation system 121C, a maximum amount of hydrocarbons which may be transported within the hydrocarbon transportation system 121C, and emissions factors and/or data used for calculating emissions factors of the transportation of hydrocarbons transported within the hydrocarbon transportation system 121C. For example, in embodiments, the hydrocarbon transportation system 121C transports hydrocarbons from the hydrocarbon extraction site 121A to the hydrocarbon refinement facility 121B and the physical sensors of the hydrocarbon supply chain network element monitoring system 120 include physical sensors for determining a location, quantity, estimated pick-up date (at the hydrocarbon extraction site 121A), an estimated delivery date (at the hydrocarbon refinement facility 121B) of hydrocarbons or materials (e.g., used or consumed at any of the hydrocarbon supply chain network elements 121) transported within the hydrocarbon transportation system 121C (e.g. for a particular shipment or purchase order), and/or emissions factors or data used for calculating emissions factors of hydrocarbons of materials (e.g., used or consumed at any of the hydrocarbon supply chain network elements 121) transported within the hydrocarbon transportation system 121C (e.g. for a particular shipment or purchase order).

The hydrocarbon supply chain network elements 121 may also include and/or be coupled with a transmitter 122*a* (which may be configured as a transmitter, receiver and/or a transceiver) for communicating the data from the hydrocarbon supply chain network element monitoring system 120 to the remote computing device 104. It should also be understood that "sensor data" may include demand data, supply data, and/or other data about one or more supply chain network elements of a supply chain, such as the data types described above and elsewhere herein.

The remote computing device 104 may also include or be coupled with a receiver 122*b* (which may be configured as a transmitter, receiver and/or a transceiver) for receiving the sensor data from the hydrocarbon supply chain network elements 121. Depending on the embodiment, the remote computing device 104 may receive sensor data from dozens, hundreds, or even thousands of different pieces of hardware at different past, present, or future hydrocarbon supply chain network elements across the globe (including, e.g., hydrocarbon extraction sites, hydrocarbon refinement facilities, and hydrocarbon transportation systems). The remote computing device 104 may include hydrocarbon supply chain data memory 124 (denoted in FIG. 1B as 8) for storing the received sensor data. Depending on the particular embodiment, the hydrocarbon supply chain data memory 124 may be configured as random access memory (RAM), read only memory (ROM), registers, a database, and/or other hardware for storing the sensor data. As such, the hydrocarbon supply chain data memory 124 may be part of the memory component 140 of FIG. 1A (described in further detail below with reference to FIG. 6), a data storage component (e.g., a data storage component 336 described below with reference to FIG. 6), and/or part of other data storage infrastructure.

A hydrocarbon supply chain carbon footprint estimator 130 (denoted in FIG. 1B as μC), represents software operations that are performed on the sensor data obtained from the hydrocarbon supply chain network element monitoring system 120. The hydrocarbon supply chain carbon footprint estimator 130 may include one or more pieces of software (such as the data collection logic 144*a*, the data prediction logic 144*b*, and/or other logical modules, including any or all of a hydrocarbon supply chain carbon footprint estimation module, a hydrocarbon supply chain carbon footprint estimation output translation module, a material forecasting module, an AI forecasting module, a Monte Carlo simulation module, an AI optimization module, and/or a mixed-integer linear programming module, as described in further detail below) and may be configured for modeling of historical data to predict supply chain carbon footprint, as described below with reference to FIGS. 2-5.

The remote computing device 104 may also include a hydrocarbon supply chain carbon footprint estimation output translator 128 that is configured to create instructions to implement the results of this analysis including. e.g., estimated hydrocarbon supply chain carbon footprints and hydrocarbon supply chain carbon footprint mitigation levers. The hydrocarbon supply chain carbon footprint estimation output translator 128 may comprise any hardware configured to translate the output of the hydrocarbon supply chain carbon footprint estimator 130 into a form that can be used in the control of technical operations within the system and which, for example, may comprise a hardware driver or controller, a control data transmitter, a document printer, a data display, or any other hardware that generates an operations output that can be used in the system to alter, enhance, or otherwise control technical operations or create a technical effect within the system 150. The hydrocarbon supply chain carbon footprint estimation output translator 128 may be configured as part of the hydrocarbon supply chain carbon footprint estimator 130 and/or may be configured as a separate piece of hardware and/or software. These instructions may be communicated via a transmitter 132*a*, (which may or may not be the same hardware as receiver 122*b*) to hydrocarbon supply chain modification hardware 134. The hydrocarbon supply chain modification hardware 134 may include or be coupled with a receiver 132*b* for receiving instructions relating to implementation of hydrocarbon supply chain carbon footprint mitigation levers (e.g., modifications to processes or hardware at any of the hydrocarbon supply chain network elements 121) and implementing the hydrocarbon supply chain carbon footprint mitigation levers to modify the hydrocarbon supply chain, a delivery stream of the hydrocarbon supply chain, or one of the hydrocarbon supply chain network elements 121.

The hydrocarbon supply chain modification hardware 134 may include hardware located at any, some, or all of the hydrocarbon supply chain network elements 121, including any, some, or all of the hydrocarbon extraction site 121A, the hydrocarbon refinement facility 121B, and the hydrocarbon transportation system 121C. The hydrocarbon supply chain modification hardware 134 may include any hardware for modifying the hydrocarbon supply chain, modifying (e.g., hardware or a process of) any nodes of the hydrocarbon supply chain network elements 121 (including the hydrocarbon extraction site 121A and the hydrocarbon refinement facility 121B), and/or modifying (e.g., a start node or third party, an end node or third party, or a transportation mechanism) any links of the hydrocarbon supply chain network elements 121 (including the hydrocarbon transportation system 121C), as is described in further detail below, implementing purchase order updates for purchase orders relating to hydrocarbons and/or yet-unfulfilled purchase orders in the in response to estimated hydrocarbon supply chain carbon footprints, change a start node of the hydrocarbon supply chain (e.g., changing the start node from the hydrocarbon extraction site 121A to a different hydrocarbon extraction site or to a third-party supplier), changing an intermediary node of the hydrocarbon supply chain (e.g., changing the facility for hydrocarbon refinement for a purchase order from the hydrocarbon refinement facility 121B to a different hydrocarbon refinement facility), changing the end node of the hydrocarbon supply chain (e.g., changing the third-party to whom a shipment of hydrocarbons is delivered), changing a delivery stream of the hydrocarbon supply chain, changing third party contractors (e.g., outsourcing transportation of hydrocarbons from the hydrocarbon transportation system 121C to a third-party contractor), or changing materials consumed, processed, manufactured, produced, transported, and/or otherwise used within node(s) or link(s) within the hydrocarbon supply chain (e.g., materials used in hydrocarbon extraction at the hydrocarbon extraction site 121A or materials used in hydrocarbon processing at the hydrocarbon refinement facility 121B.

In embodiments, the hydrocarbon supply chain 134 may include any hardware for implementing modifications to the hydrocarbon supply chain or to one or more network elements of the hydrocarbon supply chain network elements 121 (including the hydrocarbon extraction site 121A, the hydrocarbon refinement facility 121B, and the hydrocarbon transportation system 121C). In embodiments, such hardware may include one or more of each of a flow rate valve, a hardware activation device, an instruction-issuing computing device, and/or other hardware. In embodiments, the flow rate valve may change, e.g., a hydrocarbon extraction rate (including ceasing hydrocarbon extraction) or other mechanical process at a node of the hydrocarbon supply chain network elements 121, such as the hydrocarbon extraction site 121A. In embodiments, the hardware activation device may mobilize hardware (e.g., an artificial lift system or a hydrocarbon refinement system) at a node of the hydrocarbon supply chain network elements 121, such as the hydrocarbon extraction site 121A and/or the hydrocarbon refinement facility 121B. In embodiments, the instruction-issuing computing device may issue instructions (e.g., by displaying instructions on one or more physical visual interfaces of the computing device or by sending notifications to one or more personal computing devices) to personnel of a node or link of the hydrocarbon supply chain network elements 121, such as the hydrocarbon extraction site 121A, the hydrocarbon refinement facility 121B, and/or the hydrocarbon transportation system 121C. In embodiments, the instruction issuing computing device may be a plurality of computing devices, each located at or associated with at least one respective node and/or link of the hydrocarbon supply chain elements 121, including the hydrocarbon extraction site 121A, the hydrocarbon refinement facility 121B, and/or the hydrocarbon transportation system 121C. In embodiments, the hydrocarbon supply chain modification hardware 134 may be or include the remote computing device 104.

In embodiments, the hydrocarbon supply chain modification hardware 134 may include hardware located at any, some, or all of the nodes and/or links of the supply chain network elements 121. For example, the hydrocarbon supply chain modification hardware 134 may include hardware located at the hydrocarbon extraction site 121A which may modify or issue an instruction to modify a rate at which hydrocarbons are extracted by the hydrocarbon extraction site 121A (e.g., the flow rate valve, the hardware activation device, the instruction-issuing computing device, and/or a physical visual interface of the instruction-issuing computing device), infrastructure for mobilizing hardware of the hydrocarbon extraction site 121A (e.g., the hardware activation device), and/or computing infrastructure for providing hydrocarbon extraction site personnel with instructions to implement, modify, or cease a drilling schedule of the hydrocarbon extraction site 121A (e.g., the instruction-issuing computing device or a physical visual interface of the instruction-issuing computing device). In another example, the hydrocarbon supply chain modification hardware 134 may include hardware located at the hydrocarbon refinement facility 121B which may modify or issue an instruction to modify a rate at which hydrocarbons are processed within the hydrocarbon refinement facility 121B (e.g., the flow rate valve, the instruction-issuing computing device, and/or a physical visual interface of the instruction-issuing computing device), infrastructure for mobilizing hardware of the hydrocarbon refinement facility 121B (e.g., the hardware activation device), and/or computing infrastructure for providing personnel with instructions to implement, modify, or cease a refinement schedule of the hydrocarbon refinement facility 121B (e.g., the instruction-issuing computing device or a physical visual interface of the instruction-issuing computing device). In another example, the hydrocarbon supply modification hardware 134 may include hardware located within the hydrocarbon transportation system 121C which may modify or issue an instruction to modify a shipment of hydrocarbons or other materials (e.g., materials used or consumed at the hydrocarbon extraction site 121A or the hydrocarbon refinement facility 121B) within the hydrocarbon transportation system 121C or a purchase order associated with the shipment (e.g., an amount of the material transported by the shipment, a pick-up date of the shipment, a delivery date of the shipment, a node or third party from which the shipment is picked up within the hydrocarbon transportation system 121C, or a node or third party to which the shipment is delivered within the hydrocarbon transportation system 121C; the hardware being, e.g., e.g., the instruction-issuing computing device or a physical visual interface of the instruction-issuing computing device), infrastructure for mobilizing a vehicle or vehicles of the hydrocarbon transportation system 121C (e.g., the hardware activation device, the instruction-issuing computing device, and/or a physical visual interface of the instruction-issuing computing device), and/or computing infrastructure for providing personnel with instructions to implement, modify, or cease a shipment, shipment schedule, or purchase order of or associated with the hydrocarbon transportation system 121C (e.g., a shipment, shipment schedule, or purchase order of hydrocarbons or of materials used or consumed at the hydrocarbon extraction site 121A or the hydrocarbon refinement facility 121B; the hardware being, e.g., the instruction-issuing computing device or a physical visual interface of the instruction-issuing computing device).

Referring again to FIG. 1A, the supply chain computing device 106 may be coupled to one or more databases 112*a*, 112*b*, 112*c* for storing supply chain data. Specifically, the supply chain computing device 106 represents one or more computing devices that communicates with entities that can be used to determine supply chain data of one or more products or materials. Examples might include computing devices that store data relating to manufacturing and transportation within the supply chain, including, in some embodiments, bill of materials data, purchasing data, supply chain network data, etc. As such, the supply chain computing device 106 may be implemented as a plurality of different computing devices one or more of which are operated by different entities. Similarly, the databases 112*a*, 112*b*, 112*c* represent the storage of data via any electronic storage medium, but where the various data may be received from different sources and/or relate to different parts of demand for a product.

Similarly, the third party emissions factor computing device 108 may represent one or more computing devices that determines third party emissions data for one or more products. Specifically, the third party emissions factor computing device 108 represents one or more computing devices that communicates with third party entities that can be used to receive or determine emissions factor data of one or more products, nodes, or links within a supply chain where a process is conducted by a third party. Examples might include computing devices that store third party manufacturing data (pertaining to, e.g., sourced raw materials), third party transportation data (pertaining to e.g., third party services used to transport materials or products), etc. which may be used to determine emissions factors associated with third party processes within the supply chain for one or more products. Thus, the databases 114*a*, 114*b*, 114*c*, which are coupled to the third party emissions computing device 108 represent the storage of data associated with emissions factors of third party products supplied by, e.g., the relevant third party or third parties.

It will be understood that the bill of materials data may include data identifying material composition breakdowns for materials produced, processed, and/or used within a supply chain of a product, including the end product of the supply chain itself. This information may be utilized for emissions factor calculation of the manufacturing of the end product of the supply chain. For example, if the end product of the supply chain is a hydrocarbon, such as distilled petroleum, gasoline, or natural gas, a material included in the composition of the end product may include petroleum but may also include compositions of materials necessary for, used in, or consumed by the extraction, distillation, and/or storage of hydrocarbons and in the transportation of hydrocarbons, and the aforementioned consumed materials in the supply chain of the gasoline.

The purchasing data may include data for delivery streams of SKUs within a supply chain of a product, including purchase order data, purchased product or material data, and supplier data.

The purchase order data may thereby include purchase orders spanning a predetermined timeframe and for specific delivery streams of specific SKUs, such as, purchase orders for all delivery streams of all SKUs within the supply chain of the product spanning the previous five years. A purchase order may be a commercial order issued by a buyer to a seller (e.g., the entity producing, transporting, or selling the product at a node within the product's supply chain). As such, purchase order history may be indicative of trends in demand for SKUs and may be used to predict future demand for SKUs including the end product of a supply chain and materials, e.g., necessary for, used in, or consumed by processes within the supply chain.

The purchased product data may include information pertaining to the products purchased within the supply chain, including, e.g., what products or materials are purchased within the supply chain, the volumes of such products of materials purchased, and historical (dating back, e.g., 5 years) and planned purchases and associated purchase data. A purchased product may be, e.g., gasoline for a transportation link, or, if the end product of the supply chain is petroleum hydrocarbon, monoethylene glycol ("MEG") used at an oil production facility. As such, purchased product data may be indicative of materials (both type and quantity) at a node or link within the supply chain and associated effects that use of that material in the context of the particular node or link has on a carbon footprint of that node or link.

The supplier data may include data pertaining to suppliers of purchased products and other third party entities associated with fulfillment of purchase orders including, e.g., data pertaining to the supplier's location (e.g., relative to nodes or links that the supplier is delivering purchased products or materials to). This data, when combined with third party emissions factor data (as described in further detail below), can be indicative of a relative difference in carbon footprint impact as affected by a choice of supplier (due to, e.g., a difference in distance traveled, transportation method, or $CO_2$ efficiency of third party processes).

The supply chain network data may include data regarding some or all individual links and nodes of the supply chain and processes included in such nodes and links. Such supply chain data may include, e.g., data pertaining to manufacturing processes in a manufacturing node (e.g., types/volume of materials consumed, types/volume of materials produced, etc.) or data pertaining to transportation processes in a link (e.g., distance traveled or fuel efficiency of transportation mechanisms). Supply chain data is used to calculate emissions factors, as such calculation requires holistic data regarding processes ongoing at each node within a supply chain to ensure that emissions factors include all activities within the supply chain (e.g., to prevent the undercounting of $CO_2$ emissions).

The supply chain network data may include demand quantity predictors. Demand quantity predictors may be calculated by a data logic of the supply chain computing device 106 or of another computing device from which the supply chain computing device 106 receives data. Demand quantity predictors may be calculated using supply chain data and configured as forecasts of future production, use, or consumption of materials (e.g., in terms of SKUs) in a delivery stream. As such, a demand quantity predictor may be a holistic indicator produced by processing of SKU, material, product, purchase order, and/or market data to forecast future demand of individual materials or products at various nodes within a supply chain. By quantifying a holistic indicator of future demand in terms of, e.g., SKU quantities, the demand quantity predictors may provide an indicator of future demand and thereby be used to model future increases or decreases in a supply chain carbon footprint.

The supply chain network data may include material consumption data. Material consumption data may include values indicating quantities or rates of consumption of SKUs of materials (materials e.g., necessary for, used in, or consumed by processes within the supply chain). The material consumption data may be determined and stored at a particular interval (e.g., daily, weekly, monthly, etc.) and/or for a certain timespan (e.g., values for each month of the 5 years prior to the current month). Additionally, the material consumption data may include values indicating material consumption quantities at, e.g., a single node in a supply chain (e.g., a production facility), inventories across certain stages of a supply chain (e.g. at every node representing a production facility), or inventories along a specific route within a supply chain (e.g., at a set of sequential nodes connected by a series of links).

For example, if the end product of the supply chain is petroleum hydrocarbon, a single node may be a hydrocarbon extraction site extraction and the material consumption data for that node may indicate a quantity or rate of SKUs of materials consumed in the process of extracting and storing hydrocarbons (e.g., petroleum, gasoline, or natural gas). The quantity may indicate the number of SKUs consumed at that node in a month, and the rate may indicate an (e.g., monthly, weekly, daily, hourly, etc.) average of SKUs consumed over the course of a specified time span (e.g., the prior five years, past 2 years, past 2 months, past week, etc.). Present and past material consumption data may be used to determine emissions factors associated with a process within the supply chain by estimating the carbon footprint of the process's consumption of a single SKU and multiplying such by the total number of SKUs consumed by the process in a time interval.

The supply chain network data may include production planning data. Production planning data may include data indicating any business plans pertaining to production, inventory, and/or consumption for a set time period from the present date (e.g., 2 years). The production planning data may include values indicating future benchmarks (e.g., production volume targets) associated with particular dates, future changes to overall production capacity (e.g., an opening date for a new production facility and associated expected production capacities associated with the production facility), and/or future changes to production capacity of a single node (e.g., an anticipated decrease in production capacity at a production facility for a time period in which the facility is expected to undergo refurbishing of production infrastructure). For example, if the end product of the supply chain is a hydrocarbon, production planning data may include, e.g., future well menus or drilling business plans as determined by business management. Production planning data may thereby be predictive of future changes in rates of material consumption, processes undergone at individual nodes, changes in process carbon footprint efficiency (e.g., per SKU consumed/produced), etc.

The supply chain network data may include production infrastructure data. Production infrastructure data may include data pertaining to the available infrastructure at production sites, which may determine or otherwise affect, e.g., the production capacity or consumption rates of a particular production site. As such, production infrastructure data may be indicative of future material consumption and product production, which, in turn, may indicate a carbon footprint association with such processes as dependent upon the volume of such processes, the particular production or consumption process used at a particular node, and/or the infrastructure used in such processes (and associated carbon efficiency data associated with such infrastructure in the context of such processes).

The supply chain network data may include supply chain risk profiles. A supply chain risk profile may identify or estimate (e.g., at an individual supply chain node or link, across a plurality of supply chain nodes or links, or for one or more materials or products in a supply chain) the nature of a risk, the probability of a risk's negative consequences manifesting, and the severity of a risk's negative consequence should the risk manifest. For example, if the end product of the supply chain is petroleum hydrocarbon, then a risk profile output of the supply chain risk prediction model could include material delay risks or stock-out risks at a hydrocarbon extraction site. The risk profile may further include an associated estimated probability of such a risk's negative consequences manifesting (e.g., as in the prior example, material delays or stock-outs). Similarly, the risk profile may include an estimated severity of the negative consequence. In different embodiments, the severity of a negative consequence may be measured in different ways, including an associated estimated temporal or financial cost associated with the negative outcome's manifestation. In the prior example, such a severity measure may, in some embodiments, be an estimated time for restocking or producing more quantities of the material, or, in other embodiments, the severity may be an estimated cost associated with material delays or stock-outs (e.g., by necessitating air-freight or emergency POs). Supply chain risk profiles may be calculated by execution of a data logic of the supply chain computing device 106 or of another computing device from which the supply chain computing device 106 receives data. Supply chain risk profiles may provide an indicator of future changes in supply chain processes (e.g., transportation processes or material consumption) by providing an indicator of a potential necessity for, e.g., emergency air transport of materials or products or an increase in the incidence of manufacturing processes.

The logistics data may include data pertaining to the links between nodes in the supply chain, including the transportation methods (and associated carbon efficiency metrics associated with the transportation method) used in such links, the routes taken in such links to travel between nodes (including the distance associated with such routes), and the transportation volume of a single shipment. The transportation data may include actual data (i.e., the actual transportation mechanism used and routes chosen) and also hypothetical data (i.e., other possible transportation mechanisms and routes which, while not used, are available as alternatives for a link). For example, if the end material of a supply chain is a hydrocarbon, then transportation data pertaining to a link between an oil refinement facility and a distribution facility may indicate that a certain volume of the hydrocarbon is transported by ship across a specified distance and that the type of ship used has a specified carbon footprint for, e.g., the specified distance and the certain volume of the hydrocarbon transported, and may further indicate alternative possible transportation mechanisms and/or routes. This data can indicate an effect on carbon footprint of, e.g., a chosen mechanism or route of transportation of a material or product in a link in the supply chain.

The data prediction logic **144*b* may include an emissions estimation module. The emissions estimation module may cause the remote computing device 104 to process data including data relating to manufacturing and transportation within the supply chain, including, in some embodiments, bill of materials data, purchasing data, supply chain network data, demand quantity predictor data, material consumption data, production planning data, risk profile data, third party emissions data etc. The emissions factor module may cause the remote computing device 104 to generate emissions data including emissions factors pertaining to processes, materials, nodes, and/or links within the supply chain and a carbon footprint of, e.g., the supply chain or of a delivery stream within the supply chain by, e.g., using the emissions factors of all processes, materials, nodes, and/or links within the supply chain to calculate (e.g., by summing all emissions factors) the relevant carbon footprint. In some embodiments, the emissions estimation module may cause the remote computing device 104 to output such emissions data only in response to a predetermined user action. In other embodiments, the emissions estimation module may cause the remote computing device 104** to access and process data inputs at a predetermined time interval (e.g., daily, weekly, monthly, etc.) to provide a regular and automated mechanism for alerting users to changes in a supply chain's carbon footprint.

An alert may include an identification of a change in a process, material, node, and/or link in a supply chain and an associated change in an estimated carbon footprint (i.e., an estimated volume of carbon emissions) of the process, material, node, and/or link of the supply chain or of the supply chain itself. A carbon footprint generated by the emissions estimation module may include carbon footprint mitigation levers which the emissions estimation module identifies as reducing the sum carbon footprint of a node, a link, a delivery stream, and/or a supply chain. The emissions estimation module, via emissions alerts, can highlight changes in a carbon footprint in real time to increase understanding by a user of the current carbon footprint and of causes of change in the carbon footprint.

By processing data relating to nodes across the entire supply chain, the emissions estimation module can thereby readily provide an up-to-date estimation of a carbon footprint, identify causes of change in the estimated carbon footprint, and identify carbon footprint levers for reducing the carbon footprint. Further, the emissions estimation module may provide (to, e.g., the user computing device 110) a visualization of the carbon footprint and may further allow a user to interact with the visualization to identify an emissions factor or carbon footprint associated with, e.g., a particular process, material, node, link, or delivery stream within the supply chain.

As described above and due to the volume of data required (e.g., several millions of data records) to be processed to calculate estimated carbon footprints, the volume of calculations required to conduct such processing, and due to the frequency at which such processing must occur (i.e., in real time as supply chain data is updated to, e.g., provide timely and regular carbon footprint alerts), such calculations generally require a the remote computing device 104. Without regular and/or constant processing (e.g., at a daily or weekly interval, or in real time as supply chain data records are updated) of data by the remote computing device 104 via the emissions estimation module, the emissions estimation would be unable to provide carbon footprint change alerts at intervals necessary to enable a user to adequately identify and avoid potential increases to a carbon footprint.

In some embodiments, the emissions estimation module may cause the remote computing device 104 to set volume of emissions change thresholds for either or both of emissions alerts or providing changes in estimated carbon footprint for display in a visualization. In those embodiments, the emissions estimation module may not output an alert and/or estimated carbon footprint change if, e.g., a threshold value in the estimated change in the carbon footprint is not met or if some other predetermined threshold or criteria is not met.

In some embodiments, the emissions estimation module may cause the remote computing device 104 to generate a visualization of a carbon footprint. Such visualizations may include interactive virtual interfaces which may be provided to the user computing device 110 such that the user may view and manipulate the interface and data displayed therein. Such visualizations may include depictions of nodes, links, processes, and/or materials within the supply chain and provide a mechanism by which the user can identify individual emissions factors or carbon footprints at individual nodes or links within the supply chain. Further, and as will be described in further detail below, the visualization of carbon footprints may include the display of an array of proposed carbon footprint mitigation levers for any individual carbon footprint or carbon footprints of a process, material, node, link, and/or delivery stream within the supply chain or of the supply chain itself. Further, the carbon footprint visualization may display scenario modeling and data visualizations associated with each of the proposed carbon footprint mitigation levers.

In some embodiments, the emissions estimation module may cause the remote computing device 104 to generate proposed carbon footprint mitigation levers. A proposed carbon footprint mitigation lever may be a modification to an element or elements of the supply chain which the carbon footprint estimation module identifies as reducing the carbon footprint of a process, material, node, link, and/or delivery stream within the supply chain or of the supply chain itself. Proposed carbon footprint mitigation levers are actions, potentially presented as a menu of options, which the emissions estimation module causes the remote computing device 104 to identify as reducing a carbon footprint. Such carbon footprint mitigation levers may include, e.g., a change in a delivery stream of an SKU or SKUs (i.e., a change in the nodes and links of the delivery stream), a change in a process occurring at a node or link, changes in third party contractors (for materials supply or transportation between supply chain nodes), etc. Other carbon footprint mitigation levers may include, e.g., changes between nodes or links between nodes used in a supply chain to fulfill one or more purchase orders, changes in third party contractors (for transportation between supply chain nodes), or changes in materials used, consumed, or produced at one or more nodes or links within the supply chain. In the case of identifying a change in materials used, consumed, or produced at a node or link, identifying a substitute material to be used may include consideration of inventories at other nodes or links and transportation of such materials to the nodes or links in which the substitute material is needed. The emissions estimation module may cause the remote computing device 104 to generate several proposed carbon footprint mitigation levers for any identified carbon footprint, and a carbon footprint visualization, as described above, may present each of the proposed carbon footprint mitigation levers to a user to allow the user to compare each proposed carbon footprint mitigation lever with scenario modeling and data visualization.

Scenario modeling for a proposed carbon footprint mitigation lever may include identifying subsequent effects of choosing a particular carbon footprint mitigation lever.

Effects may include an associated reduction in an estimated carbon footprint. Effects may also include subsequent necessary changes to a delivery stream or to processes and/or materials used at a node or link. For example, changing the node at which a product is produced to fulfill a purchase order may necessarily require changes to intermediary links and nodes between the production node and the product's end node along the supply chain. Since data in the databases 112a-112c, 114a-114c spans nodes and links end-to-end across a supply chain, the emissions estimation module can cause the remote computing device 104 to model such scenarios resulting from the choice of a carbon footprint mitigation lever end-to-end at nodes and links spanning the entirety of the supply chain, rather than being isolated to first-order consequences of actions at an individual supply chain link or node.

The remote computing device 104 may conduct such scenarios by, e.g., utilizing an AI or ML model of the data prediction logic 144b to predict results of and (if necessary) identify subsequent necessary supply chain changes necessitated by a proposed carbon footprint mitigation lever. For example, if one material is substituted, by a carbon footprint mitigation lever, for another in production at a production node, then a subsequent change may include a change in time to complete a PO and may, thereby, result in the need for subsequent changes in planned PO fulfillment strategy. In a visualization interface, as will be described in further detail below, such subsequent necessary supply chain changes may be modifiable by a user of the user computing device 110.

Data visualization may include a comparison of effects on estimated carbon footprint resulting from different carbon footprint mitigation levers. Data visualization may also include visualization of changes in a delivery stream or in material needs of a link or node due to the choice of carbon footprint mitigation lever. The data visualizations may also include assessments of cost and value impacts (e.g., in the form of changes in time of production or transportation, or in financial costs associated with such) associated with adopting an action associated with a carbon footprint mitigation lever. Such data visualizations may thereby provide a mechanism by which a user of the user computing device 110 can compare different carbon footprint mitigation levers by comparing the resulting change in carbon footprint and associated costs and effects of each carbon footprint mitigation lever.

Visualizations generated by the remote computing device 104 may include visualizations integrated into a broader digital twin, which may span part of a supply chain or end to end across the entirety of a supply chain. Carbon footprint alerts may thereby be integrated into a visualization interface (displayed by the user computing device 110) of the digital twin, permitting a user to view supply chain information in concert with carbon footprint estimations, carbon footprint alerts, and proposed carbon footprint mitigation levers associated with each estimated carbon footprint or alert. Alerts may be sorted categorically in the visualization to identify processes associated with each alert, including categories such as strategic planning, material forecast, material procurement, supplier fulfillment, inventory, and consumption.

For example, a supplier fulfillment alert may be associated with a delivery schedule change for a particular purchase order at a particular node and a consumption alert may indicate a change in consumption trends at a production node, and each alert may thereby be associated with a change in the associated carbon footprint resulting from the change in delivery schedule or consumption trend, respectively. The visualization may indicate all relevant data, insights, and actions related to the alert, including, e.g., a confidence interval or accuracy metric associated with the alert and/or the alert's underlying estimated carbon footprint.

In some embodiments (such as those integrated within a broader supply chain digital twin), the carbon footprint mitigation levers may be displayed by the user computing device 110 in a visualization interface, such as the visualization interface described above, along with data associated with an alert or process corresponding to the estimated carbon footprint the carbon footprint levers are identified to mitigate. For example, an interface may display current POs, historical data (related to, e.g., PO fulfillment, material consumption, etc.) as well as potential or optimized data indicating projected changes to supply chain projections (e.g., inventory levels) upon the implementation of a carbon footprint mitigation lever. The visualization interface may further enable customization of a proposed carbon footprint mitigation lever or levers, such as altering proposed PO modifications. Additionally the visualization may enable a user to submit a request or command to implement a selected carbon footprint mitigation lever. Further, in embodiments incorporated into a broader digital twin, the digital twin may thereby update projections across the supply chain and provided to some or all users of the digital twin incorporating the selected carbon footprint mitigation lever.

In some embodiments incorporated into a broader digital twin, a carbon footprint may be integrated into a supply chain decision-making interface, where, e.g., decisions affecting the supply chain may be monitored and implemented. For example, in a system where carbon footprints of a supply chain are identified and carbon footprint mitigation levers (which may be generated options for reducing the identified supply chain carbon footprint) are provided, embodiments may further incorporate the carbon footprint estimation mechanism described herein to, when carbon footprint mitigation levers are displayed by the decision-making interface of the digital twin, display a change in estimated carbon footprint associated with implementation of that lever. Similarly, in a digital twin, a carbon footprint estimation may be incorporated into other mechanisms, visualizations, or processes, such as predicted or projected changes to a supply chain, implementation of a modification to a supply chain, or regularly updated data pertaining to a supply chain.

A visualization generated by the remote computing device 104 may be localized to a particular user of the user computing device 110 (e.g., a particular buyer or supply chain manager), displaying alerts, estimated carbon footprints, and/or proposed carbon footprint mitigation levers specific to the user's, e.g., credential or approved decision-making authority. Additionally, if, for a specific alert, estimated carbon footprint, and/or proposed carbon footprint mitigation lever, there are multiple responsible agents (i.e., multiple users who may be permitted to view a carbon footprint or select a proposed carbon footprint mitigation lever), the visualization may enable users who are such responsible agents to communicate with other such responsible agents indicating choice of carbon footprint mitigation lever or in an approval hierarchy, requesting approval to enact a user-selected carbon footprint mitigation lever.

By alerting users to changes in a carbon footprint, providing and visualizing carbon footprints, proposing carbon footprint mitigation levers, and enabling scenario modeling, data visualization, and option comparison between each carbon footprint mitigation lever, the emissions estimation module may thereby enable accurate calculation of carbon footprints of a process, material, node, link, and/or delivery stream within the supply chain or of the supply chain itself. Such user support optimizes the emissions-tracking of materials, processes, nodes, links, and/or delivery streams of a supply chain or of the supply chain itself.

By using data, identifying carbon footprints, providing carbon footprint mitigation levers, and enabling scenario modeling, data visualization, and option comparison end-to-end across a supply chain, the emissions estimation module can cause the remote computing device 104 to simplify large supply chains and large quantities of data associated with nodes, links, materials, and processes associated with such supply chains to enable a user to readily identify and react to a carbon footprint of the supply chain and to changes in the carbon footprint. Further, the emissions estimation module can cause the remote computing device 104 to simplify such large supply chains and large quantities of data at regular time intervals (e.g., daily, weekly, or monthly) to alert users to changes in a carbon footprint without requiring user input or querying of the remote computing device 104. As such, the remote computing device 104 may enable end-to-end control of a carbon footprint of a large supply chain or of parts of a large supply chain and enable the reduction of a carbon footprint end-to-end across a large supply chain.

The emissions estimation module may use a plurality of individual modules to process data and produce the above-described outputs. Each module may, e.g., be an algorithm using some or all of the entirety of the data inputs provided to the emissions estimation module and each module may contribute to all or some of the outputs generated by the emissions estimation module. Different modules within the emissions estimation module may produce separate outputs of data that is nonetheless related (e.g., several module producing different carbon footprint estimations for a single process, material, node, or link), and so outputs of various modules of the emissions estimation may be harmonized via a variety of algorithms (such as, e.g., statistical confidence interval calculation and comparison) to produce a single unified output value (e.g., a single carbon footprint estimation or estimated emissions factor for a single process, material, node, link, or delivery stream). The emissions estimation module may contain modules using algorithms such as AI forecasting algorithms, Monte Carlo simulations, optimization algorithms including MILP or AI optimization algorithms, and others to calculate any, some, or all of emissions factors, carbon footprints, or carbon footprint mitigation levers (and, in some embodiments, associated scores/rankings of such levers).

As will be described in further detail below, the emissions estimation module may cause the remote computing device 104 to output a limited set of proposed carbon footprint mitigation levers rather than all possible carbon footprint mitigation levers identified by the emissions estimation module. The emissions estimation module may cause the remote computing device 104 to identify which carbon footprint mitigation levers to present to the user as proposed carbon footprint mitigation levers by selecting only carbon footprint mitigation levers which reduce a carbon footprint and/or only carbon footprint mitigation levers which do not provide comparatively less utility than another available carbon footprint mitigation lever. To determine which potential carbon footprint mitigation levers to present as proposed carbon footprint mitigation levers, the emissions estimation module may include an AI optimization module and/or a mixed-integer linear programming (MILP) module.

The emissions estimation module may include an AI optimization module. An AI optimization module may be an AI optimization algorithm trained on datasets sourced end-to-end across a supply chain including categories of data described above. Similarly, the emissions estimation module may include an MILP module. The MILP module may be an MILP optimization algorithm whose source data includes datasets sourced end-to-end across a supply chain (e.g., categories of data described above) and whose constraints are predetermined or provided by a user via the user computing device 110. The AI optimization module and MILP module may thereby cause the remote computing device 104 to deduce best actions for the emissions estimation module to output as proposed carbon footprint mitigation levers by comparing individual actions against associated constraints or cost values such as a minimum necessary reduction in carbon footprint, a maximum cost associated with implementing a carbon footprint mitigation lever, or a comparative utility of one carbon footprint mitigation lever to another.

Further, a choice by a user of the user computing device 110 of a proposed carbon footprint mitigation lever may necessitate further changes in a material or process used or conducted within a link or node or in a link, node, or delivery stream. The emissions estimation module may identify such necessary changes or processes, materials, nodes, links, or delivery streams requiring change when a user selects or inspects a proposed carbon footprint mitigation lever. In some embodiments, the emissions estimation module may enable the user to (via, e.g., the visualization output to the user computing device 110) choose what changes should or must be made to, e.g., processes, materials, nodes, links, and/or delivery streams and implement such changes within the visualization output to the user computing device 110, and, in those embodiments, the emissions estimation module may subsequently generate an associated estimated carbon footprint of a process, material, node, link, and/or delivery stream within the supply chain or of the supply chain itself resulting from the choice of carbon footprint mitigation lever and subsequent changes as input by the user. In other embodiments, the emissions estimation module may, in providing proposed carbon footprint mitigation levers, utilize a calculation priority in determining such necessary subsequent changes to a process, material, node, link, and/or delivery stream within the supply chain or to the supply chain itself. As such, a plurality of proposed carbon footprint mitigation levers may include the same primary change to a node, link, process, material, or delivery stream of the supply chain but include differing subsequent changes necessitated by the primary change. For example, changing a manufacturing process may change the required materials for that process. In this example, the primary change shared by several carbon footprint mitigation levers may be the same changed process, but different carbon footprint mitigation levers may include, e.g., different third party vendors for the changed materials and different carbon footprints and costs associated with each choice.

The emissions estimation module may, in different embodiments, use different calculation priorities to identify, score, and/or rank proposed carbon footprint mitigation levers. A calculation priority may, in some embodiments, be predetermined and used universally in the emissions estimation module's calculations. In some embodiments, a user of the user computing device 110 may select a calculation priority prior to estimation of a carbon footprint. In further embodiments, the emissions estimation module may not use a calculation priority at all. In some embodiments, the calculation priority may do any or all of excluding certain carbon footprint mitigation levers from being proposed, score proposed carbon footprint mitigation levers, or provide a ranking or order of carbon footprint mitigation levers output by the remote computing device 104 to the user computing device 110.

The emissions estimation module may use a calculation priority of similarity of potential supply chains (i.e., new supply chains resulting from changes in a process, material, node, or delivery stream due to adoption of a proposed carbon footprint mitigation lever). Such a calculation priority may include adopting subsequent necessary changes resulting from a primary change associated with a carbon footprint mitigation lever that conform the new supply chain as closely as possible to the original supply chain for which a carbon footprint was estimated. In those embodiments, the calculation priority may cause the emissions estimation module to score each generated carbon footprint mitigation lever (i.e., according to similarity to the original supply chain), and the emissions estimation module may use the score to exclude certain carbon footprint mitigation levers from being proposed or rank the proposed carbon footprint mitigation levers to select the order in which the levers are presented to a user.

The emissions estimation module may use a calculation priority of minimization of estimated carbon footprint. This calculation priority may cause the emissions estimation module to score each generated carbon footprint mitigation lever by the size of an estimated carbon footprint upon implementation of each lever, and the emissions estimation module may use the score to, e.g., exclude certain carbon footprint mitigation levers from being proposed or rank the proposed carbon footprint mitigation levers to select the order in which the carbon footprint mitigation levers are presented to a user.

The emissions estimation module may use additional calculation priorities not described herein, may use several estimation modules (using a harmonization algorithm using each generated score as an input), or may not use any calculation priority (e.g., by relying entirely on user input, as described above).

The emissions estimation module may thereby cause the remote computing device 104 to calculate carbon footprints and output carbon footprint change alerts, carbon footprints, visualizations, and proposed carbon footprint mitigation levers. Further, the emissions estimation module may enable scenario modeling of implementation of proposed carbon footprint mitigation levers and may further utilize a calculation priority to conduct such scenario modeling.

Figure 2:
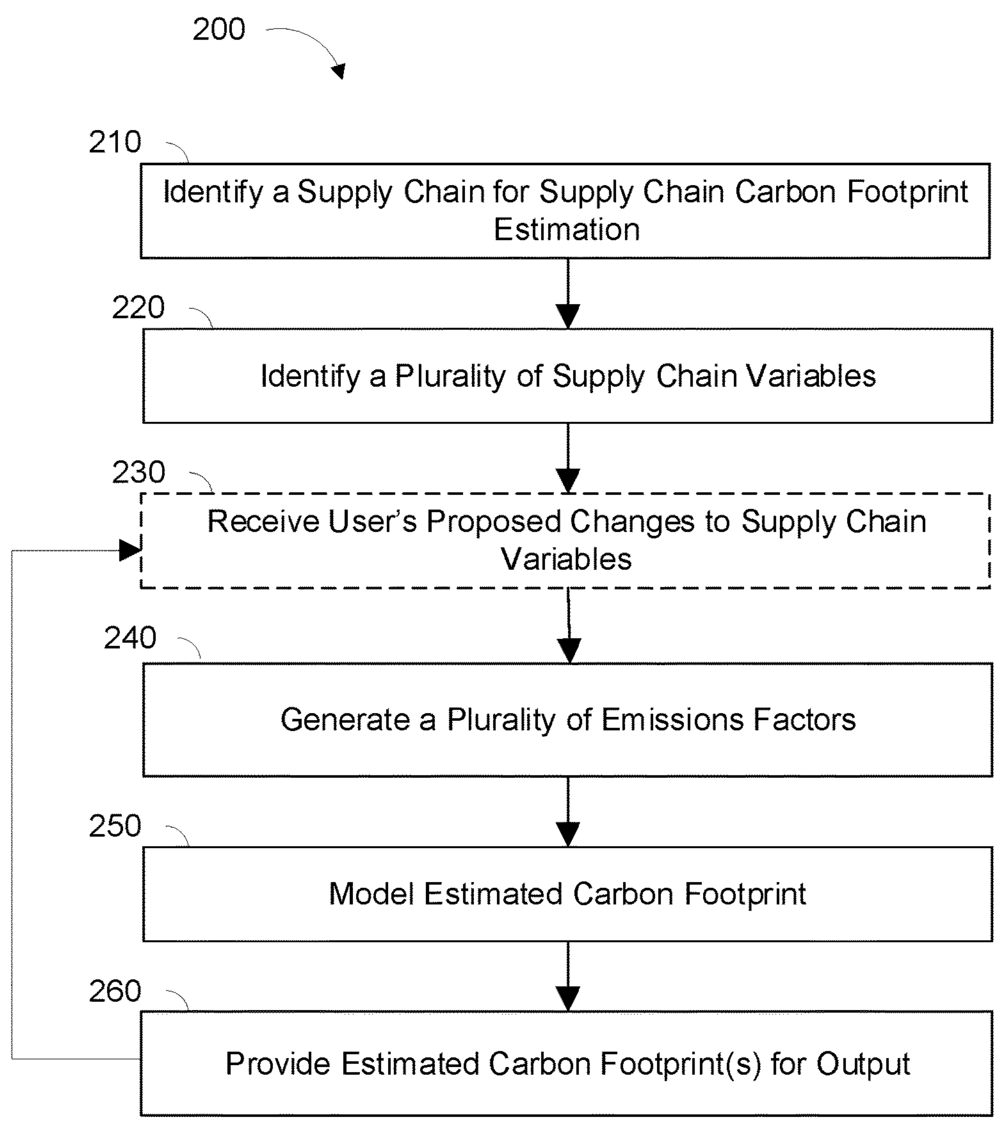
FIG. 2 depicts a first process for estimating supply chain carbon footprint, according to one or more embodiments shown and described herein.

FIG. 2 depicts a process 200 for estimating a carbon footprint without using a calculation priority. It is noted that while a discrete number of blocks are illustrated in a predetermined order, additional and/or fewer steps, in any order, may be included without departing from the scope of the present disclosure.

In block 210, supply chain for carbon footprint estimation may be identified. Depending on the embodiment, the supply chain may be an actual supply chain and/or a potential supply chain. A potential supply chain may be one having proposed changes from an actual supply chain. The supply chain may include a delivery stream with a plurality of network elements. The plurality of network elements may include at least one supply chain node, supply chain link, supply chain process, and/or a supply chain material. In some embodiments, a carbon footprint may be estimated for only a portion of a supply chain including a node, link, and/or delivery stream within the supply chain.

In block 220, a plurality of supply chain variables may be identified for the supply chain. Each of the plurality of supply chain variables may include manufacturing data, transportation data, purchasing data, and/or third party emissions data. The plurality of supply chain variables includes network element variables that affect at least one network element of the plurality of network elements of the delivery stream.

Supply chain variables may affect a network element of a supply chain, and, in such cases, such variables are described herein as "network element variables." A network element variable may affect network elements such as production nodes (e.g., by warranting a certain level of production) or links (e.g., by affecting total volume of product which must be transported).

Manufacturing data may include bill of materials data, purchasing data, supply chain network data, demand quantity predictor data, material consumption data, production planning data, risk profile data, third party emissions data, and/or other data pertaining to the manufacture of materials or products within the supply chain. Manufacturing data may further include any additional data pertinent to manufacturing processes, such that emissions factors may be generated for all manufacturing processes (and their associated nodes) including processes for sourcing, extracting, or consuming materials for manufacturing. Manufacturing data may include data that may indicate a change in processes in the future (e.g., production planning information), and such may be used to identify future sets of manufacturing variables associated with particular dates or ranges of dates. By identifying all manufacturing processes, variables for such processes, and data associated with each variable, emissions factors for such manufacturing processes may be subsequently calculated.

Transportation data may include bill of materials data, purchasing data, supply chain network data, demand quantity predictor data, material consumption data, production planning data, risk profile data, third party emissions data, and/or other data pertaining to the manufacture of materials or products within the supply chain. Transportation data may further include any additional data pertinent to transportation processes, such that emissions factors may be generated for transportation processes (and associated links and/or nodes) including processes for transporting materials or products (e.g., in a link), or processes by which a material used in manufacturing is supplied by a vendor. Transportation data may include data that may indicate a change in processes in the future (e.g., a planned change in third party contractors used for transporting a product), and such may be used to identify future sets of transportation variables associated with particular dates or ranges of dates. By identifying all transportation processes, variables for such processes, and data associated with each variable, emissions factors for such transportation processes may be subsequently calculated.

In block 230 a user's proposed changes to supply chain variables may be received. Prior to any estimation of a carbon footprint, a user may provide proposed changes, such that the changes to a carbon footprint may be inspected to determine what would result from those proposed changes. In some embodiments, the user may propose changes after a prior iteration of the process 200, as the process 200 may output a proposed carbon footprint mitigation lever that requires subsequent changes to manufacturing or transportation variables of the supply chain. In such an example, the process 200 may occur iteratively a plurality of times as the user proposes a plurality of differing sets of changes to the supply chain to adopt a carbon footprint mitigation lever to compare the effects of each differing set of changes. In another example, a user may simply desire to receive an estimation of a carbon footprint of an existing supply chain and, in this example, the user proposes no changes to supply chain variables.

In block 240, the supply chain variables may be used to generate emissions factors for network elements in the supply chain. The estimated emissions factors may indicate an associated emissions volume of an associated network element and, thereby, one or more processes, materials, nodes and/or links.

In some embodiments, the emissions factors are generated in response to determining a change to at least one of the plurality of supply chain variables. In some embodiments, the emissions factors are generated in response to determining a change to at least one of the network element variables of the delivery stream. Depending on the embodiment, the emissions factors may be generated in response to determining a change to at least one of the network element variables of a network element of the supply chain. As described above, due to the volume of data required (e.g., several millions of data records) to be processed to generate estimated carbon footprints, the volume of calculations required to conduct such generation, and due to the frequency at which such generation occurs (e.g., in real time or near real time as supply chain data is updated to provide timely and regular carbon footprint alerts), such calculations generally require a computing device capable of performing the requisite calculations in the desired timeframe to allow the results to be usable.

In some embodiments, the estimated emissions factors of block 240 are associated with particular dates indicating an estimation of what the emissions for a network element within the supply chain may be at the particular date. The estimated emissions factors may be a range of amounts, rather than a single discrete value. Further, the estimated emissions factors may be associated with a probability or confidence interval associated with the amount or range of amounts. The estimated emissions factors may be calculated by an emissions estimation module including emissions estimation algorithms.

In block 250, at least one emissions factor of the plurality of emissions factors generated in block 240, may be utilized to model an estimated carbon footprint produced by a supply chain, a delivery stream, and/or one or more network elements and, in some embodiments, associated carbon footprint mitigation levers for the supply chain, delivery stream, or one or more network elements. In some embodiments, estimating a carbon footprint may include summing single emissions factors associated with each supply chain, network element, and/or delivery stream analyzed, including emissions factors for all manufacturing and transportation processes occurring therein. In some embodiments, several emissions factors may be generated (e.g., by different modules, models, and/or algorithms of an emissions estimation module) for each supply chain, network element, and/or delivery stream analyzed. The differing emissions factors for each supply chain, network element, and/or delivery stream may be harmonized via one or more algorithms, such as statistical confidence interval calculation and comparison, to produce a single unified output value (e.g., a single estimated emissions factor for a single process, material, node, link, or delivery stream).

In block 260, an estimated carbon footprint and/or a carbon footprint mitigation lever may be provided for the analyzed supply chain, delivery stream, and/or network element(s). In embodiments, an alert identifying a change in carbon footprint when compared to a prior estimated carbon footprint for the supply chain, delivery stream, and/or network element(s) may be provided. Further, the estimated carbon footprint, alert, and/or carbon footprint mitigation lever(s) may be output, such as in a visualization. The visualization may enable user interactivity, provide scenario modeling, and/or indicate effect comparisons for each of the carbon footprint mitigation lever(s). The estimated carbon footprint may be a single value or a range of values. Further, the value or range of values of the carbon footprint may be associated with a confidence interval or statistical probability. The carbon footprint may also be associated with a date, including the current date or a date or range of dates in the future, and multiple carbon footprints may be output by the process 200, with each carbon footprint corresponding to a date or a range of dates (e.g., by modeling future carbon footprint outputs).

Figure 3:
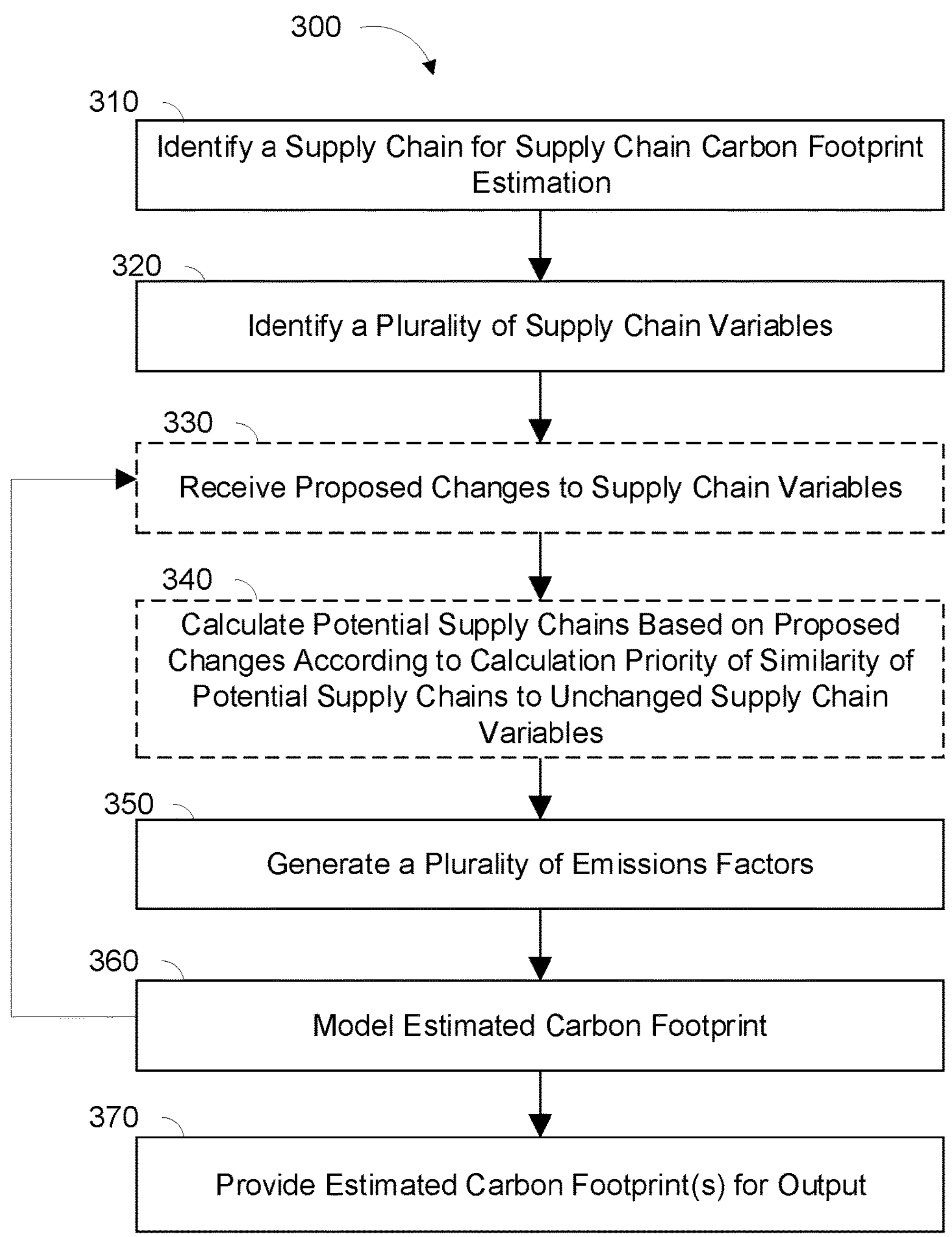
FIG. 3 depicts a second process for estimating supply chain carbon footprint, according to one or more embodiments shown and described herein.

FIG. 3 depicts a process 300 for estimating a carbon footprint using a calculation priority of similarity of potential supply chains to unchanged supply chain variables. It is noted that while a discrete number of blocks are illustrated in a predetermined order, additional and/or fewer steps, in any order, may be included without departing from the scope of the present disclosure.

In block 310, supply chain for carbon footprint estimation may be identified. Depending on the embodiment, the supply chain may be an actual supply chain and/or a potential supply chain. A potential supply chain may be one having proposed changes from an actual supply chain. The supply chain may include a delivery stream with a plurality of network elements. The plurality of network elements may include at least one supply chain node, supply chain link, supply chain process, and/or a supply chain material. In some embodiments, a carbon footprint may be estimated for only a portion of a supply chain including a node, link, and/or delivery stream within the supply chain.

In block 320, a plurality of supply chain variables for the supply chain may be identified. Each of the plurality of supply chain variables may include data identifying manufacturing data, transportation data, purchasing data, and/or third party emissions data. The plurality of supply chain variables include network element variables that affect at least one network element of the plurality of network elements of the delivery stream.

In block 330, a user's proposed changes to supply chain variables may be received. Prior to any estimation of a carbon footprint, a user may provide proposed changes, such that the changes to a carbon footprint may be inspected to determine what would result from those proposed changes. In some embodiments, the user may propose changes after a prior iteration of the process 300, as the process 300 may output a proposed carbon footprint mitigation lever that requires subsequent changes to manufacturing or transportation variables of the supply chain. In such an example, the process 300 may occur iteratively a plurality of times as the user proposes a plurality of differing sets of changes to the supply chain to adopt a carbon footprint mitigation lever to compare the effects of each differing set of changes. In another example, a user may simply desire to receive an estimation of a carbon footprint of an existing supply chain and, in this example, the user proposes no changes to supply chain variables.

In block 340, other potential supply chains (including one or more differing network elements and/or delivery streams) may be calculated based on the proposed changes (if any) of the block 330. In embodiments, such supply chains include subsequent changes necessitated by the user's proposed change (e.g., changes to subsequent links and/or nodes resulting from a proposed change in the choice of a manufacturing node of a delivery stream). In embodiments, a plurality of possible supply chains are calculated and subsequently scored according to the calculation priority of similarity of potential supply chains to unchanged supply chain variables. In embodiments, such scoring includes calculating a higher score for a potential supply chain that more closely resembles the original supply chain than a score generated for a potential supply chain that less closely resembles the original supply chain. In embodiments, the block 340 provides these scores to subsequent blocks to or rank outputs associated with each supply chain. Further processes associated with block 340 are described in further detail below with reference to FIG. 4.

In embodiments, one or more entire supply chains are scored in the block 340. In other embodiments, scoring is limited to one or more network elements or delivery streams of the supply chain. In some such embodiments, calculations of other potential supply chains are limited to merely calculating one or more potential network elements or delivery streams.

In block 350, the supply chain variables may be used to generate emissions factors for network elements in each supply chain (real and/or potential). The estimated emissions factors may indicate an associated emissions volume of an associated (real or potential) network element and, thereby, one or more processes, materials, nodes and/or links.

In some embodiments, the emissions factors are generated in response to determining a change to at least one of the plurality of supply chain variables. In some embodiments, the emissions factors are generated in response to determining a change to at least one of the network element variables of the delivery stream. Depending on the embodiment, the emissions factors may be generated in response to determining a change to at least one of the network element variables of a network element of the supply chain. As described above, due to the volume of data required (e.g., several millions of data records) to be processed to generate estimated carbon footprints, the volume of calculations required to conduct such generation, and due to the frequency at which such generation occurs (e.g., in real time or near real time as supply chain data is updated to provide timely and regular carbon footprint alerts), such calculations generally require a remote computing device capable of performing the requisite calculations in the desired timeframe to allow the results to be usable.

In some embodiments, the estimated emissions factors of block 340 are associated with particular dates indicating an estimation of what the emissions for a network element within the supply chain may be at the particular date. The estimated emissions factors may be a range of amounts, rather than a single discrete value. Further, the estimated emissions factors may be associated with a probability or confidence interval associated with the amount or range of amounts. The estimated emissions factors may be calculated by an emissions estimation module including emissions estimation algorithms.

In block 360, at least one emissions factor of the plurality of emissions factors generated in block 350, may be utilized to model an estimated carbon footprint produced by each (real and/or potential) supply chain, delivery stream, and/or network element(s) and, in some embodiments, associated carbon footprint mitigation levers for the (real and/or potential) supply chain, delivery stream, or one or more network elements. In some embodiments, estimating a carbon footprint may include summing single emissions factors associated with each (real and/or potential) supply chain, network element, and/or delivery stream analyzed, including emissions factors for all manufacturing and transportation processes occurring therein. In some embodiments, several emissions factors may be generated (e.g., by different modules, models, and/or algorithms of an emissions estimation module) for each supply chain, network element, and/or delivery stream analyzed. The differing emissions factors for each supply chain, network element, and/or delivery stream may be harmonized via one or algorithms, such as statistical confidence interval calculation and comparison, to produce a single unified output value (e.g., a single estimated emissions factor for a single process, material, node, link, or delivery stream).

In block 370, an estimated carbon footprint and/or a carbon footprint mitigation lever may be provided for each (real and/or potential) analyzed supply chain, delivery stream, and/or network element(s). In embodiments, an alert identifying a change in carbon footprint when compared to a prior estimated carbon footprint for a real supply chain, delivery stream, and/or network element(s) may be provided. Further, the estimated carbon footprint, alert, and/or carbon footprint mitigation lever(s) may be output, such as in a visualization. The visualization may enable user interactivity, provide scenario modeling, and/or indicate effect comparisons for each of the carbon footprint mitigation lever(s). The estimated carbon footprint may be a single value or a range of values. Further, the value or range of values of the carbon footprint may be associated with a confidence interval or statistical probability. The carbon footprint may also be associated with a date, including the current date or a date or range of dates in the future, and multiple carbon footprints may be output by the process 300, with each carbon footprint corresponding to a date or a range of dates (e.g., by modeling future carbon footprint outputs).

Figure 4:
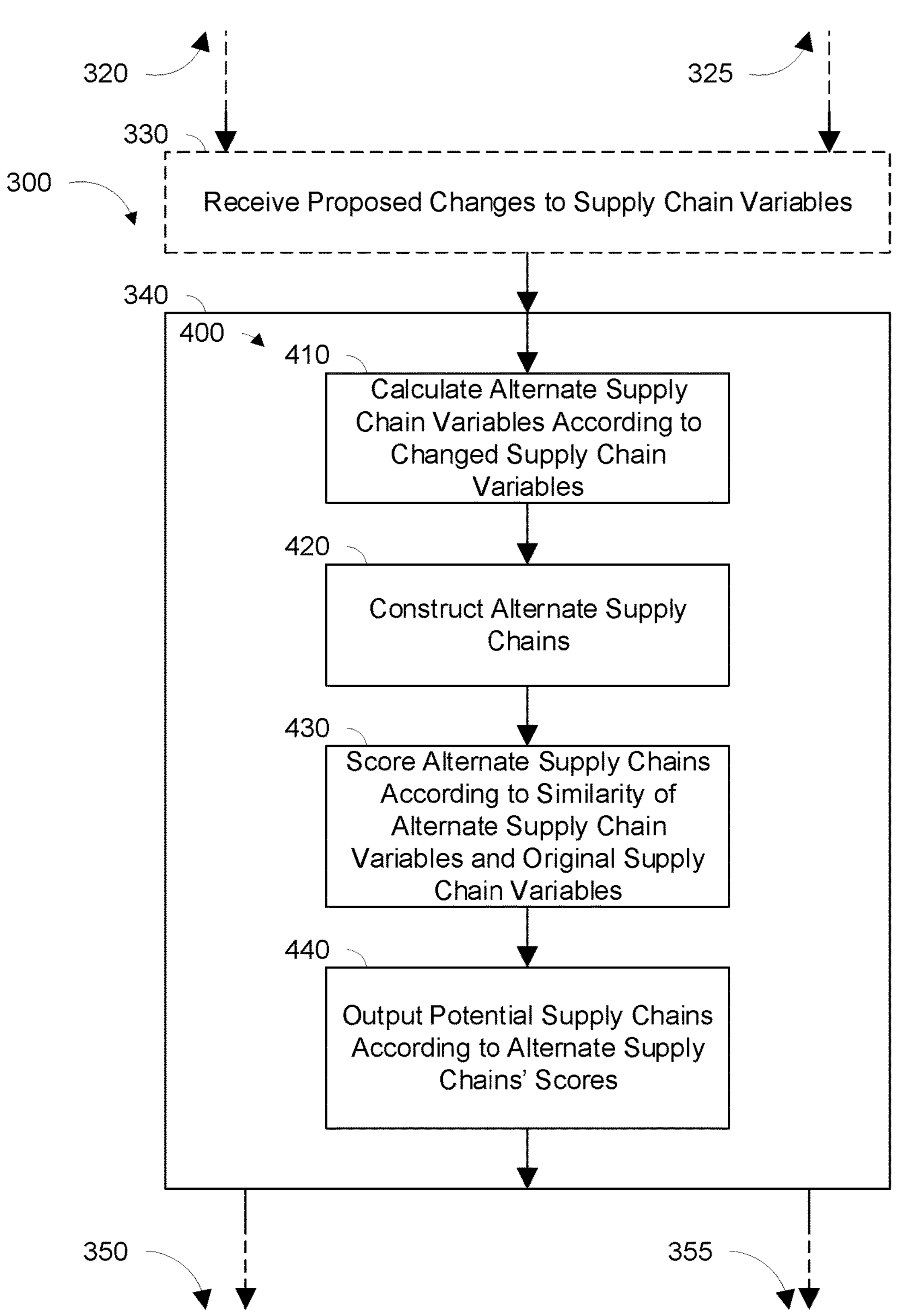
FIG. 4 depicts a process for calculating potential supply chains based on a user's proposed changes according to a calculation priority of similarity of potential supply chains to unchanged supply chain variables, according to one or more embodiments shown and described herein.

FIG. 4 depicts a sub-process 400 for the calculation of potential supply chains based on proposed changes according to a calculation priority of similarity of potential supply chains to unchanged supply chain variables, as occurs in the block 340 of the process 300. In block 410, alternate supply chain variables may be calculated according to the proposed changes to supply chain variables of the block 330. In embodiments, calculating includes altering further supply chain variables whose change is necessary as a result of the proposed changes to supply chain variables of block 330. For example, changing a manufacturing process in the block 330 may necessitate subsequent changes in materials used in the manufacturing process and may further necessitate usage of (potentially one of many) third party vendors to supply the changed materials. In the block 410, such changes are identified and possible alternatives calculated.

In block 420, alternate supply chains may be constructed according to the calculated variables of the block 410. In some embodiments, the block 420 includes generating every possible alternate supply chain that incorporates the proposed changes to supply chain variables of the block 330 (according to predetermined constraints). In some embodiments, in the block 420, up to a specific number of alternate supply chains or an otherwise more limited number of alternate supply chains may be generated. In some embodiments, only generate one or more alternate network elements and/or delivery streams, rather than generate an entire alternate supply chain, may be generated.

In block 430, all of the alternate supply chains may be scored according the calculation priority of similarity of alternate supply chains to the original supply chain. In embodiments, scoring includes associating a value for each changed variable indicating a degree of difference between an alternate supply chain variable and an associated or corresponding original supply chain variable. For example, a change to a delivery stream may have a higher score depending on the number of nodes and links the delivery stream has in common with an original delivery stream of an unchanged supply chain. In some embodiments, scoring only compares one or more alternate network elements and/or delivery streams, rather than comparing an entire supply chain.

In block 440, potential supply chains, network elements, or delivery streams of the alternate supply chains, network elements, or delivery streams may be provided according to each alternate supply chain's score. In embodiments, such providing includes eliminating alternate supply chains from being output as proposed supply chains if the alternate supply chains have a score (according to the calculation priority) that does not exceed a predetermined (e.g., by the user in block 310) threshold. In embodiments, such providing also or alternatively includes ordering or ranking the proposed supply chains according to their score.

Figure 5:
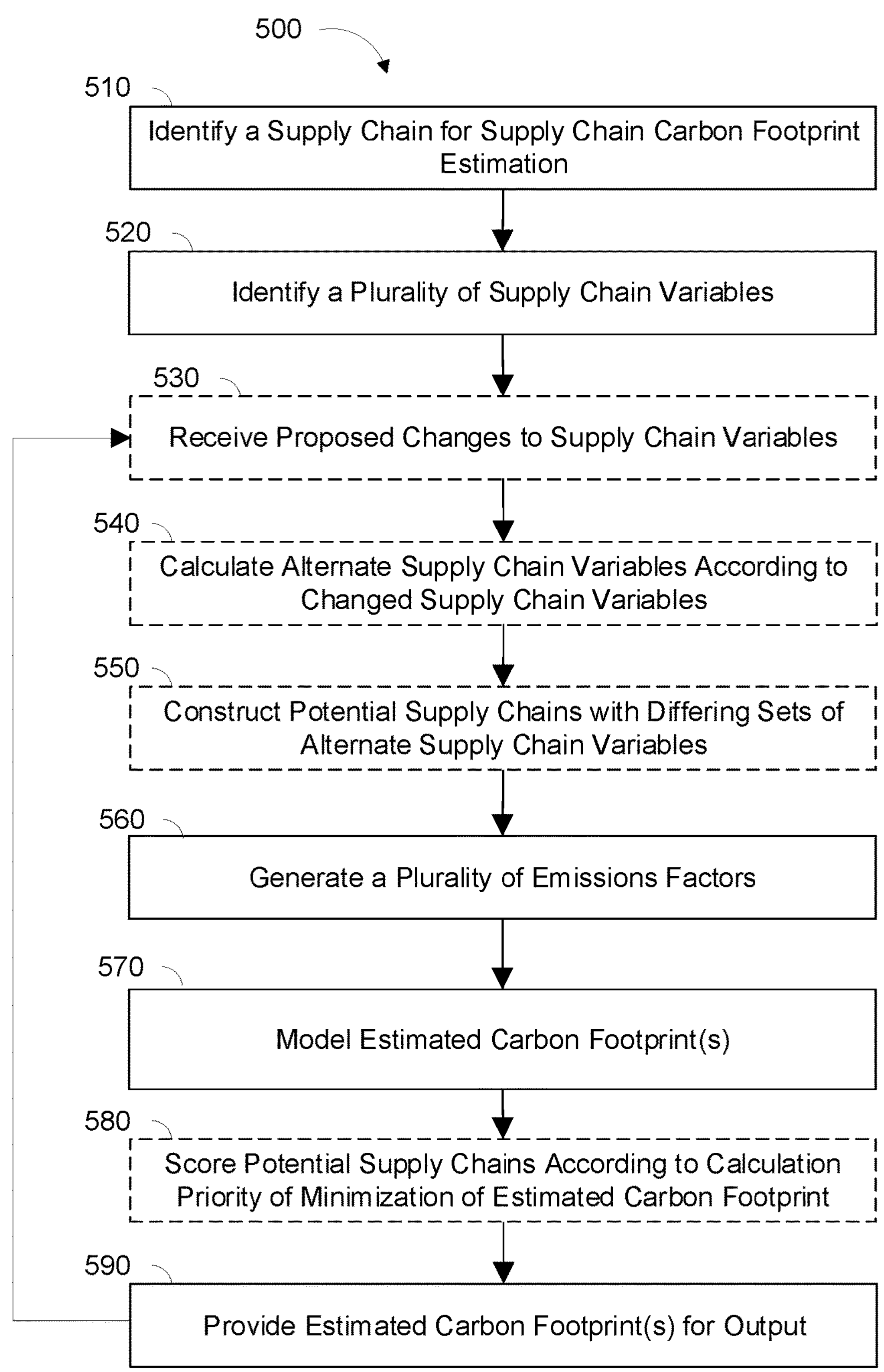
FIG. 5 depicts a third process for estimating supply chain carbon footprint, according to one or more embodiments shown and described herein.

FIG. 5 depicts a process 500 for estimating a carbon footprint using a calculation priority of minimization of estimated carbon footprint. It is noted that while a discrete number of blocks are illustrated in a predetermined order, additional and/or fewer steps, in any order, may be included without departing from the scope of the present disclosure.

In block 510, a chain for carbon footprint estimation may be identified. Depending on the embodiment, the supply chain may be an actual supply chain and/or a potential supply chain. A potential supply chain may be one having proposed changes from an actual supply chain. The supply chain may include a delivery stream with a plurality of network elements, and the plurality of network elements may include at least one supply chain node, supply chain link, supply chain process, and/or a supply chain material. In some embodiments, a carbon footprint may be estimated for only a portion of a supply chain including a node, link, and/or delivery stream within the supply chain.

In block 520, a plurality of supply chain variables may be identified for the supply chain. Each of the plurality of supply chain variables may include data identifying manufacturing data, transportation data, purchasing data, or third party emissions data. The plurality of supply chain variables include network element variables that affect at least one network element of the plurality of network elements of the delivery stream.

In block 530, a user's proposed changes to supply chain variables may be received. Prior to any estimation of a carbon footprint, a user may provide proposed changes, such that the changes to a carbon footprint may be inspected to determine what would result from those proposed changes. In some embodiments, the user may propose changes after a prior iteration of the process 500, as the process 500 may output a proposed carbon footprint mitigation lever that requires subsequent changes to manufacturing or transportation variables of the supply chain. In such an example, the process 500 may occur iteratively a plurality of times as the user proposes a plurality of differing sets of changes to the supply chain to adopt a carbon footprint mitigation lever to compare the effects of each differing set of changes. In another example, a user may simply desire to receive an estimation of a carbon footprint of an existing supply chain and, in this example, the user proposes no changes to supply chain variables.

In block 540, alternate supply chain variables may be calculated according to the proposed changes to supply chain variables of the block 530. This may include altering further supply chain variables whose change is necessary as a result of the proposed changes to supply chain variables of the block 530. For example, a proposed change of changing a manufacturing process in the block 530 may necessitate subsequent changes in materials used in the manufacturing process and may further necessitate usage of (potentially one of many) third party vendors to supply the changed materials. In embodiments, potential necessary changes are identified and possible alternatives are calculated.

In block 550, potential supply chains may be constructed according to the calculated supply chain variables of the block 540. In some embodiments, the block 550 includes generating every possible alternate supply chain that incorporates the proposed changes to supply chain variables of the block 530 (according to predetermined constraints). In other embodiments, the block 550 includes generating up to a specific number of alternate supply chains or an otherwise more limited number of alternate supply chains. In some embodiments, constructing potential supply chains is limited to constructing only one or more potential network elements and/or delivery streams of a supply chain, rather than constructing entire potential supply chains.

In block 560, the supply chain variables may be used to generate emissions factors for network elements in each supply chain (real and/or potential). The estimated emissions factors may indicate an associated emissions volume of an associated (real or potential) network element and, thereby, one or more processes, materials, nodes and/or links.

In some embodiments, the emissions factors are generated in response to determining a change to at least one of the plurality of supply chain variables. In some embodiments, the emissions factors are generated in response to the remote computing device 104 determining a change to at least one of the network element variables of the delivery stream. Depending on the embodiment, the emissions factors may be generated in response to determining a change to at least one of the network element variables of a network element of the supply chain. As described above, due to the volume of data required (e.g., several millions of data records) to be processed to generate estimated carbon footprints, the volume of calculations required to conduct such generation, and due to the frequency at which such generation occurs (e.g., in real time or near real time as supply chain data is updated to provide timely and regular carbon footprint alerts), such calculations generally require a computing device capable of performing the requisite calculations in the desired timeframe to allow the results to be usable.

In some embodiments, the estimated emissions factors of block 560 may be associated with particular dates indicating an estimation of what the emissions for a network element within the supply chain may be at the particular date. The estimated emissions factors may be a range of amounts, rather than a single discrete value. Further, the estimated emissions factors may be associated with a probability or confidence interval associated with the amount or range of amounts. The estimated emissions factors may be calculated by an emissions estimation module including emissions estimation algorithms.

In block 570, at least one emissions factor of the plurality of emissions factors generated in block 350 may be utilized to model an estimated carbon footprint produced by each (real and/or potential) supply chain, delivery stream, and/or network element(s) and, in some embodiments, associated carbon footprint mitigation levers for the (real and/or potential) supply chain, delivery stream, or one or more network elements. In some embodiments, estimating a carbon footprint may include summing single emissions factors associated with each (real and/or potential) supply chain, network element, and/or delivery stream analyzed, including emissions factors for all manufacturing and transportation processes occurring therein. In some embodiments, several emissions factors may be generated (e.g., by different modules, models, and/or algorithms of an emissions estimation module) for each supply chain, network element, and/or delivery stream analyzed. The differing emissions factors for each supply chain, network element, and/or delivery stream may be harmonized via one or more algorithms, such as statistical confidence interval calculation and comparison, to produce a single unified output value (e.g., a single estimated emissions factor for a single process, material, node, link, or delivery stream).

In block 580, each real and/or potential supply chain may be scored according to each supply chain's estimated carbon footprint, such that a supply chain with a larger estimated carbon footprint receives a higher score.

In block 590, an estimated carbon footprint and/or carbon footprint mitigation lever may be provided for each analyzed supply chain, delivery stream, and/or network element(s). In embodiments, an alert identifying a change in carbon footprint when compared to a prior estimated carbon footprint for the supply chain may be provided. Further, the estimated carbon footprint, alert, and/or the carbon footprint mitigation lever(s) may be output, such as in a visualization. The visualization may enable user interactivity, provide scenario modeling, and/or indicate effect comparisons for each of the carbon footprint mitigation lever(s). The estimated carbon footprint may be a single value or a range of values. Further, the value or range of values of the carbon footprint may be associated with a confidence interval or statistical probability. The carbon footprint may also be associated with a date, including the current date or a date or range of dates in the future, and multiple carbon footprints may be output by the process 500, with each carbon footprint corresponding to a date or a range of dates (e.g., by modeling future carbon footprint outputs).

In the block 590, proposed carbon footprint mitigation levers, their associated potential supply chains, and carbon footprints of the associated potential supply chains may be provided according to the calculation priority of minimization of estimated carbon footprint. Providing such according to the calculation priority can include ordering each carbon footprint mitigation lever according to an associated score calculated according to the calculation priority, and certain carbon footprint mitigation levers having an associated score above a predetermined threshold (identified by a user in block 510) may be omitted.

Figure 6:
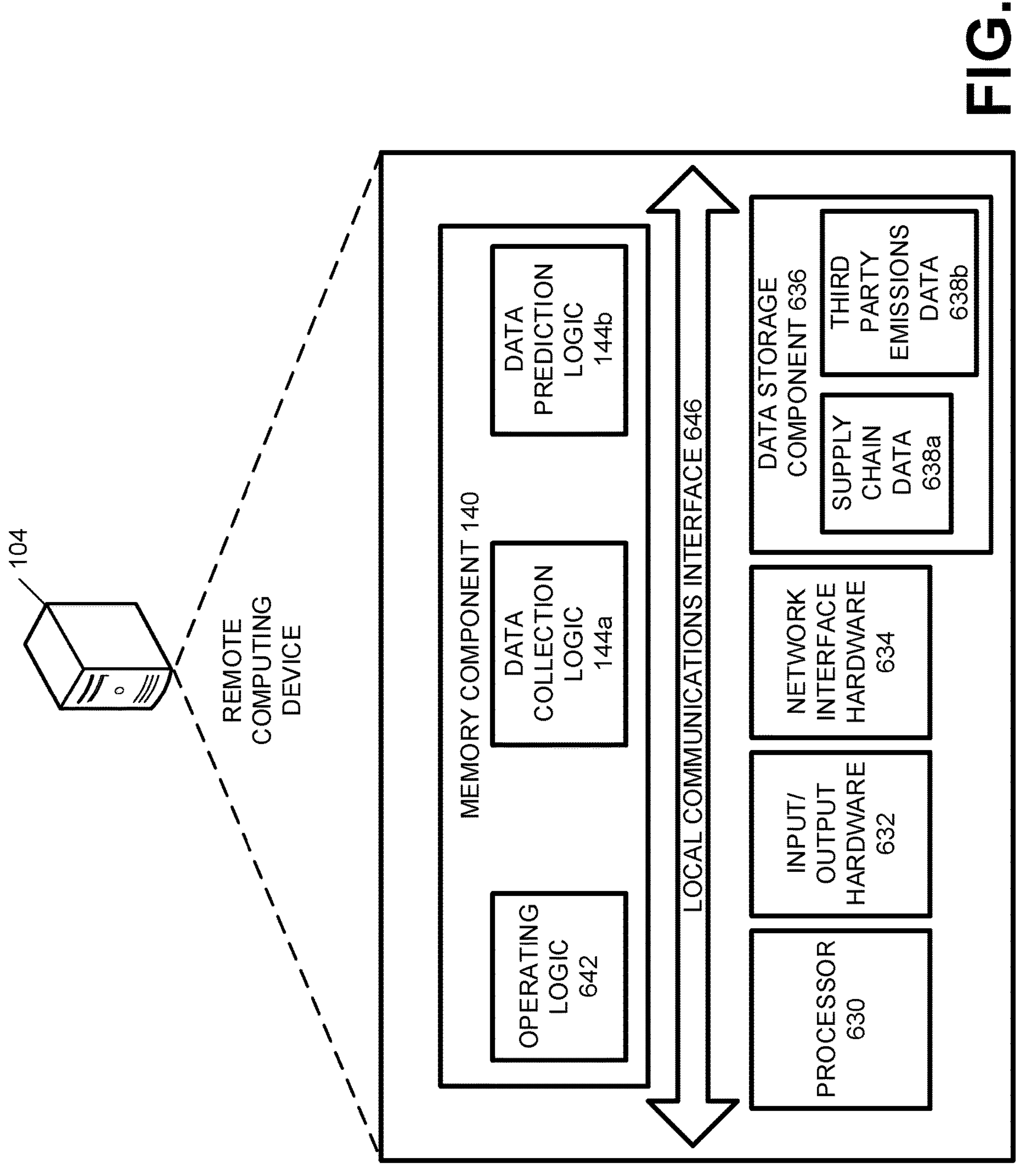
FIG. 6 depicts components of a computing device for estimating supply chain carbon footprint, according to one or more embodiments shown and described herein.

FIG. 6 depicts components of a remote computing device 104, according to embodiments described herein. The remote computing device 104 includes a processor 630, input/output hardware 632, the network interface hardware 634, a data storage component 636 (which stores supply chain data 638*a*, third party emissions data 338*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 642, the data collection logic 144*a* and the data predication logic 144*b*. The data collection logic 144*a* and the data prediction logic 144*b* may each include a plurality of different pieces of logic, each of which may be embodied as a computer program, firmware, and/or hardware, as an example. A local communications interface 646 is also included in FIG. 6 and may be implemented as a bus or other communication interface to facilitate communication among the components of the remote computing device 104.

The processor 630 may include any processing component operable to receive and execute instructions (such as from a data storage component 636 and/or the memory component 140). The network interface hardware 634 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 104 and other computing devices, such as via the internet, to provide the functionality described herein.

The operating logic 642 may include an operating system and/or other software for managing components of the remote computing device 104. As also discussed above, the data collection logic 144*a* and the data prediction logic 144*b* may reside in the memory component 140 and may be configured to cause the processor 330 provide facilitate collect supply chain data 638*a* and third party emissions data 638*b* and make estimations, as described above.

It should be understood that while the components in FIG. 6 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the data collection logic 144*a* and the data prediction logic 144*b* may reside on different computing devices. As an example, one or more of the functionality and/or components described herein may be provided by another computing device, such as the supply chain computing device 106, third party emissions computing device 108, the user computing device 110, etc.

Additionally, while the remote computing device 104 is illustrated with the data collection logic 144*a* and the data prediction logic 144*b* as separate logical components, this is also an example. In some embodiments, a single piece of logic may cause the remote computing device 104 to provide the described functionality.

It is noted that recitations herein of a component of the present disclosure being "configured" or "programmed" in a particular way, to embody a particular property, or to function in a particular manner, are structural recitations, as opposed to recitations of intended use. It is also noted that recitations herein of "at least one" component, element, etc., or "one or more" components, elements, etc. should not be used to create an inference that the alternative use of the articles "a" or "an" should be limited to a single component, element, etc.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for estimating supply chain carbon footprint. It should also be understood that these embodiments are merely exemplary and are not intended to limit the scope of this disclosure.

What is claimed is:

1. A system for hydrocarbon supply chain modification based on estimated hydrocarbon supply chain carbon footprint, the system comprising:

a hydrocarbon supply chain network element monitoring system that includes at least one sensor for monitoring a plurality of hydrocarbon supply chain network elements; elements, wherein the at least one sensor may be configured as a flow sensor for determining at least one of the following: an amount of hydrocarbon stored, an amount of materials consumed in hydrocarbon extraction, or an amount of hydrocarbon extracted in a given time period;

hydrocarbon supply chain modification hardware;

a hydrocarbon supply chain data memory;

a hydrocarbon supply chain carbon footprint estimation output translator; and a hydrocarbon supply chain carbon footprint estimator that includes a processor that is configured to cause the system to perform at least the following:

identify a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receive, by the hydrocarbon supply chain data memory from the hydrocarbon supply chain network element monitoring system via data from the sensor, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements;

in response to determining a change to at least one of the network element variables, generate, using at least one of the network element variables, a plurality of emissions factors, wherein each emissions factor is associated with an affected network element of the plurality of hydrocarbon supply chain network elements and represents an emissions volume for a predetermined time interval;

model, using at least one emissions factor of the plurality of emissions factors, an estimated carbon footprint produced by the delivery stream;

generate, using the estimated carbon footprint, one or more hydrocarbon supply chain carbon footprint mitigation levers, wherein generating the hydrocarbon supply chain carbon footprint mitigation levers includes at least one of the following: utilizing a flow rate valve to implement a change in a delivery stream in the nodes and links of the delivery stream or utilizing the flow rate valve to implement a change in materials used, consumed, or produced at one or more nodes or links within the supply chain; and implement at least one of the hydrocarbon supply chain carbon footprint mitigation levers using the hydrocarbon supply chain carbon footprint estimation output translator, the hydrocarbon supply chain modification hardware, or both.

2. The system of claim 1, wherein the hydrocarbon supply chain carbon footprint estimator further causes the system to receive a proposed change to supply chain variables.

3. The system of claim 1, wherein generating the one or more hydrocarbon supply chain carbon footprint mitigation levers further comprises generating an alert for a change in carbon footprint.

4. A method for modifying a hydrocarbon supply chain based on estimated hydrocarbon supply chain carbon footprint, the method comprising:

identifying, by a hydrocarbon supply chain carbon footprint estimator, a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receiving, by a hydrocarbon supply chain data memory from a hydrocarbon supply chain network element monitoring system via data from a sensor, wherein the hydrocarbon supply chain network element monitoring system includes the sensor for monitoring a plurality of hydrocarbon supply chain network elements; elements, wherein the sensor may be configured as a flow sensor for determining at least one of the following: an amount of hydrocarbon stored, an amount of materials consumed in hydrocarbon extraction, or an amount of hydrocarbon extracted in a given time period, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements;

in response to determining a change to at least one of the network element variables, generating, by the hydrocarbon supply chain carbon footprint estimator and using at least one of the network element variables, a plurality of emissions factors, wherein each of the plurality of emissions factors is associated with an affected network element of the plurality of hydrocarbon supply chain network elements and represents an emissions volume for a predetermined time interval;

modeling, by the hydrocarbon supply chain carbon footprint estimator and using at least one emissions factor of the plurality of emissions factors, an estimated carbon footprint produced by the delivery stream;

generating, by the hydrocarbon supply chain carbon footprint estimator and using the estimated carbon footprint, one or more hydrocarbon supply chain carbon footprint mitigation levers, wherein generating the hydrocarbon supply chain carbon footprint mitigation levers includes at least one of the following: utilizing a flow rate valve to implement a change in a delivery stream in the nodes and links of the delivery stream, or utilizing a flow rate valve to implement a change in materials used, consumed, or produced at one or more nodes or links within the supply chain; and implementing at least one of the hydrocarbon supply chain carbon footprint mitigation levers using a hydrocarbon supply chain carbon footprint estimation output translator, hydrocarbon supply chain modification hardware, or both.

5. The method of claim 4, further comprising receiving at least one proposed change to the hydrocarbon supply chain variables.

6. The method of claim 5, further comprising predicting, by the hydrocarbon supply chain carbon footprint estimator, at least one potential hydrocarbon supply chain based on the at least one proposed change.

7. The method of claim 6, wherein predicting the at least one potential hydrocarbon supply chain includes determining a similarity of the at least one potential hydrocarbon supply chain to the plurality of hydrocarbon supply chain variables.

8. The method of claim 7, wherein predicting of one or more potential supply chains further comprises:

predicting, by the hydrocarbon supply chain carbon footprint estimator, a plurality of alternate supply chain variables;

constructing, by the hydrocarbon supply chain carbon footprint estimator, at least one alternate hydrocarbon supply chain; and scoring, by the hydrocarbon supply chain carbon footprint estimator, the at least one alternate hydrocarbon supply chains according to a similarity of each alternate hydrocarbon supply chain of the one or more alternate hydrocarbon supply chains to the plurality of hydrocarbon supply chain variables.

9. The method of claim 6, the method further comprising:

constructing, by the hydrocarbon supply chain carbon footprint estimator, at least one potential hydrocarbon supply chain, wherein each of the at least one potential hydrocarbon supply chains includes a differing set of alternate hydrocarbon supply chain variables;

scoring, by the hydrocarbon supply chain carbon footprint estimator, each potential hydrocarbon supply chain of the one or more potential hydrocarbon supply chains according to minimization of estimated carbon footprint; and outputting, by the hydrocarbon supply chain carbon footprint estimation output translator and according to the scoring of each potential hydrocarbon supply chain of the one or more potential hydrocarbon supply chains, estimated carbon footprints of each potential hydrocarbon supply chain of the one or more potential hydrocarbon supply chains.

10. The method of claim 4, wherein generating the estimated carbon footprint further comprises generating an alert for a change in carbon footprint.

11. The method of claim 10, wherein generating the estimated carbon footprint further comprises displaying, using the hydrocarbon supply chain carbon footprint estimation output translator, the estimated carbon footprint and at least one of the alert and the hydrocarbon supply chain carbon footprint mitigation lever in a visualization.

12. The method of claim 11, wherein the visualization is integrated into a digital twin of the delivery stream.

13. The method of claim 11, wherein the visualization further comprises effect comparisons of at least two hydrocarbon supply chain carbon footprint mitigation levers of the one or more hydrocarbon supply chain carbon footprint mitigation levers.

14. The method of claim 11, wherein the visualization further comprises scenario modeling of the hydrocarbon supply chain carbon footprint mitigation lever, wherein the scenario modeling identifies subsequent effects of choosing the hydrocarbon supply chain carbon footprint mitigation lever.

15. The method of claim 10, wherein the alert indicates an estimated hydrocarbon supply chain carbon footprint change of the delivery stream, wherein the estimated hydrocarbon supply chain carbon footprint change exceeds a predetermined threshold.

16. The method of claim 4, wherein the hydrocarbon supply chain carbon footprint mitigation lever includes at least one of the following: updating an unfulfilled purchase order, changing at least one supply chain node or supply chain link of the delivery stream, or changing materials used, consumed, processed, produced, or transported in the supply chain.

17. The method of claim 4, wherein the hydrocarbon supply chain carbon footprint estimator includes at least one of the following: an artificial intelligence (AI) forecasting algorithm, a Monte Carlo simulation, an AI optimization algorithm, or an MILP algorithm.

18. A non-transitory computer-readable medium that stores logic that, when executed by a hydrocarbon supply chain carbon footprint estimator, causes the hydrocarbon supply chain carbon footprint estimator to perform at least the following:

identify a hydrocarbon supply chain for hydrocarbon supply chain carbon footprint estimation, wherein the hydrocarbon supply chain includes a delivery stream comprising a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receive, by a hydrocarbon supply chain data memory from a hydrocarbon supply chain network element monitoring system that includes at least one sensor for monitoring a plurality of hydrocarbon supply chain network elements; elements, wherein the at least one sensor may be configured as a flow sensor for determining at least one of the following: an amount of hydrocarbon stored, an amount of materials consumed in hydrocarbon extraction, or an amount of hydrocarbon extracted in a given time period, a plurality of hydrocarbon supply chain variables of the hydrocarbon supply chain, wherein each of the plurality of hydrocarbon supply chain variables includes data identifying at least one of the following: manufacturing data, transportation data, purchasing data, or third party emissions factor data, wherein the plurality of hydrocarbon supply chain variables includes network element variables that each affect at least one hydrocarbon supply chain network element of the plurality of hydrocarbon supply chain network elements;

in response to determining a change to at least one of the network element variables, generate, using at least one of the network element variables, a plurality of emissions factors, wherein each emissions factor is associated with an affected network element of the plurality of hydrocarbon supply chain network elements and represents an emissions volume for a predetermined time interval;

model, using at least one emissions factor of the plurality of emissions factors, an estimated carbon footprint produced by the delivery stream;

generate, using the estimated carbon footprint, one or more hydrocarbon supply chain carbon footprint mitigation levers, wherein generating the hydrocarbon supply chain carbon footprint mitigation levers includes at least one of the following: utilizing a flow rate valve to implement a change in a delivery stream in the nodes and links of the delivery stream, or utilizing a flow rate valve to implement a change in materials used, consumed, or produced at one or more nodes or links within the supply chain; and implement at least one of the hydrocarbon supply chain carbon footprint mitigation levers using a hydrocarbon supply chain carbon footprint estimation output translator, hydrocarbon supply chain modification hardware, or both.

19. The non-transitory computer-readable medium of claim 18, wherein the logic further causes the hydrocarbon supply chain carbon footprint estimator to receive a proposed change to supply chain variables.

20. The non-transitory computer-readable medium of claim 18, wherein generating the estimated carbon footprint further includes generating an alert for a change in carbon footprint.

* * * * *